United States Patent
Thompson

(10) Patent No.: US 11,991,064 B2
(45) Date of Patent: May 21, 2024

(54) DEVICE AND PROCESS FOR DETECTING AND LOCATING SOURCES OF WIRELESS DATA PACKETS

(71) Applicant: SERINUS SECURITY PTY LTD, Melbourne (AU)

(72) Inventor: Michael Phillip Thompson, Melbourne (AU)

(73) Assignee: SERINUS SECURITY PTY LTD, Melbourne (AU)

(*) Notice: Subject to any disclaimer, the term of this patent is extended or adjusted under 35 U.S.C. 154(b) by 0 days.

(21) Appl. No.: 18/043,746

(22) PCT Filed: Sep. 2, 2021

(86) PCT No.: PCT/AU2021/051017
§ 371 (c)(1),
(2) Date: Mar. 2, 2023

(87) PCT Pub. No.: WO2022/047534
PCT Pub. Date: Mar. 10, 2022

(65) Prior Publication Data
US 2023/0246939 A1    Aug. 3, 2023

(30) Foreign Application Priority Data
Sep. 2, 2020 (AU) .............................. 2020903138

(51) Int. Cl.
*H04L 43/16* (2022.01)
*H04L 41/084* (2022.01)
*H04L 43/18* (2022.01)

(52) U.S. Cl.
CPC .......... *H04L 43/16* (2013.01); *H04L 41/0843* (2013.01); *H04L 43/18* (2013.01)

(58) Field of Classification Search
None
See application file for complete search history.

(56) References Cited

U.S. PATENT DOCUMENTS

| 6,801,756 B1* | 10/2004 | Agrawal | H04L 43/0888 455/67.11 |
| 7,532,895 B2 | 5/2009 | Hrastar | |
| 7,688,731 B2* | 3/2010 | Haumont | H04L 12/5602 370/235 |

(Continued)

OTHER PUBLICATIONS

International Search Report and Written Opinion dated Oct. 18, 2021, PCT Application No. PCT/AU2021/051017, 16 pages.

*Primary Examiner* — Ranodhi Serrao
(74) *Attorney, Agent, or Firm* — MH2 TECHNOLOGY LAW GROUP, LLP

(57) ABSTRACT

A device for detecting and locating sources of wireless data packets exhibiting selected, defined behaviour of interest. The device monitors an environment and populates a queue of packets dependent on a selected detection template which carries algorithms to packets to detect the behaviour of interest. The device extracts identifier data from packets in the queue to identify sources of detected behaviour. Information on signal strength of wireless data packets received by an antenna from identified, detected sources is displayed at a user interface. The interface is responsive to selections of template, selection of source devices detected and adjustments to the orientation and/or proximity of an antenna relative to selected, detected source devices to provide an interface for detection and location of source devices exhibiting selected behaviour of interest.

2 Claims, 6 Drawing Sheets

(56) References Cited

U.S. PATENT DOCUMENTS

| | | | |
|---|---|---|---|
| 7,756,132 B2* | 7/2010 | Copps | H04W 28/10 |
| | | | 370/392 |
| 8,817,615 B2* | 8/2014 | Kutscher | H04W 28/10 |
| | | | 370/204 |
| 9,103,900 B2 | 8/2015 | Alizadeh-Shabdiz | |
| 9,739,868 B2* | 8/2017 | Baxley | H04W 12/08 |
| 9,800,608 B2* | 10/2017 | Korsunsky | G06F 21/55 |
| 10,027,689 B1 | 7/2018 | Rathor et al. | |
| 10,122,743 B2* | 11/2018 | Ridley | H04L 43/106 |
| 10,270,793 B2* | 4/2019 | Ridley | H04L 43/50 |
| 10,574,547 B2* | 2/2020 | Gupta | H04L 41/0604 |
| 2007/0005795 A1* | 1/2007 | Gonzalez | H04N 19/25 |
| | | | 375/E7.006 |
| 2013/0016610 A1* | 1/2013 | Kutscher | H04W 28/0278 |
| | | | 370/230 |
| 2015/0127763 A1* | 5/2015 | Pope | G06F 15/17331 |
| | | | 709/212 |
| 2015/0245360 A1* | 8/2015 | Gao | H04W 72/121 |
| | | | 370/329 |
| 2015/0350228 A1* | 12/2015 | Baxley | H04L 63/1483 |
| | | | 726/23 |
| 2017/0187605 A1* | 6/2017 | Pope | G06F 15/167 |
| 2017/0264487 A1* | 9/2017 | Scahill | H04L 41/0816 |
| 2017/0272966 A1* | 9/2017 | Scahill | H04J 11/005 |
| 2017/0359735 A1* | 12/2017 | Jain | H04L 43/0864 |
| 2017/0373950 A1* | 12/2017 | Szilagyi | H04L 43/08 |
| 2018/0005247 A1* | 1/2018 | Loeb | G06F 16/435 |
| 2018/0115576 A1* | 4/2018 | Ridley | H04L 69/16 |
| 2018/0139219 A1 | 5/2018 | Sabata et al. | |
| 2018/0213566 A1* | 7/2018 | Baron | H04W 74/0816 |
| 2018/0288198 A1* | 10/2018 | Pope | H04L 41/16 |
| 2019/0319863 A1* | 10/2019 | Gupta | H04W 24/04 |

* cited by examiner

DEVICE AND PROCESS FOR DETECTING AND LOCATING SOURCES OF WIRELESS DATA PACKETS

CROSS-REFERENCE TO RELATED APPLICATIONS

This application is a U.S. National Stage application of PCT/AU2021/051017, filed Sep. 2, 2021, and claims priority to Australian Patent Application No. 2020903138, which was filed Sep. 2, 2020. Each of these priority applications is incorporated herein by reference in their entirety.

FIELD OF THE INVENTION

This invention relates to improvements in respect of processes for detection of sources of wireless data packets, such as devices which are sources of wireless data packets in an environment.

BACKGROUND OF THE INVENTION

Wireless data packet networks involve a network of devices exchanging wireless data packets. Wireless data packets are units of data transmissions made wirelessly, such as by radiofrequency signals. The units have a packet structure specified, typically, by a wireless network standard such as a Wi-Fi standard or Bluetooth standard. Typically, a packet structure defines elements in a wireless data packet and fields in the elements.

By the nature of wireless transmissions, a variety of network devices exhibiting a variety of network behaviours may participate in a wireless data packet network.

In some scenarios an administrator or other party using a wireless data packet network may not readily have available the details of devices participating in a network or details of the behaviour of devices participating in the network.

In some scenarios an administrator or other party using a wireless data packet network may not readily be able to discover devices participating in a network or environment.

In other scenarios an operator may want to discover or audit what wireless packet devices may be operating in a given environment.

The use of wireless data packet networks and wireless network devices is becoming ubiquitous and wireless networks can often operate in increasingly complex scenarios in terms of complexity of wireless transmissions, number of devices participating in a network, temporal dynamics of participation in a transmission in a network environment, and complexity of physical features of a wireless network environment.

Various network monitoring tools are conventionally available. These face challenges in the complexity of transmissions in a wireless network environment and/or the complexity of physical features in wireless network environments. Conventional network monitoring tools have limitations in their utility to personnel wanting to control and/or conduct network monitoring exercises, particularly where these exercises may require dynamic decision-making and/or movement of apparatus providing these network monitoring tools.

It would therefore be of advantage to have a process which could address any or all of the above problems, or at least provide the public with an alternative choice.

It would therefore be of advantage to have a device which could address any or all of the above problems, or at least provide the public with an alternative choice.

DISCLOSURE OF THE INVENTION

Aspects of the invention provide an interactive device for detecting and locating devices transmitting wireless data packets in a wireless network environment, the transmitting devices exhibiting selected behaviour of interest in the wireless network environment, the device including:
- a network-monitoring module operable to monitor the wireless network environment to receive wireless data packets;
- a queue module operable to populate one or more queues for wireless data packets from the received wireless data packets, wherein the one or more queues are populated dependent on one or more detection template which defines a set of rules applied to data carried in received wireless data packets to detect whether one or more transmitting devices in the network are exhibiting a behaviour of interest;
- a device-identifier module operable to extract device identifier data from the wireless data packets in the queue to identify said one or more detected transmitting devices exhibiting said defined behaviour;
- a signal strength data module operable to generate signal strength data carrying information on signal strength of wireless data packets received by an antenna from the same of the one or more identified, detected source devices,
- a user interface operable to
  i) receive inputs indicating a selection of a detection template made at the user interface to allow an operator to select the defined behaviour of interest of source devices to be detected,
  ii) display information indicating said selected behaviour of interest, to
  iii) display alert data carrying information indicating that a device in the network is exhibiting a behaviour of interest defined by the selected detection template, and to
  iv) display the signal strength data from the same of one or more devices detected as exhibiting the behaviour of interest defined by the selected template,
- wherein the template is updated in response to template selections and said signal strength is updated substantially in real-time, and
- wherein the user is provided with an interactive user interface which is responsive to selections of behaviours of interest, provides alert to the user if devices exhibiting said behaviour are detected and displays substantially real-time information on signal strength for use in locating the detected device.

The device may comprise a device-identifier module operable to extract device identifier data from the wireless data packets in the queue to identify said one or more detected source devices exhibiting said defined behaviour.

The user interface may receive inputs indicating a selection of a detected device from a number of devices detected and identified at the user interface.

Aspects of the invention provide a process for detecting devices acting as sources of wireless data packets, wherein the detected devices exhibit one or more defined behaviour of interest, the process comprising the steps:
  i) receiving wireless data packets;
  populating one or more data stores by adding received wireless data packets,
    wherein wireless data packets received are added to the one or more data stores dependent on a detection template, and wherein a detection template comprises code defining the behaviour of interest to detect whether any device being a source of any received wireless data packets is exhibiting the behaviour of interest, ii) extracting device identifier data from one or more wireless data packets added to the data store to identify devices being the source of said one or more wireless data packets wireless packets to identify one or more detected source devices which are exhibiting said defined behaviour;

iii) generating display data carrying information on a signal strength of wireless data packets from the same of the one or more identified, detected source devices, and iv) receiving inputs at the user interface, the inputs indicating a selection of a detection template made at the user interface to allow a user to select the defined behaviour of interest used to detect sources of wireless data packets.

The display data may be generated so as to be dependent on an orientation of the antenna relative to the one or more identified, detected source devices.

The display data may be generated so as to be dependent on a location of the antenna relative to the one or more identified, detected source devices.

The steps may be performed in a loop to allow the display data to be interactive substantially in real time to adjustments of orientation and/or location of the directional antenna relative to one or more identified, detected source devices.

The steps are performed in a loop to allow the display data to be interactive substantially in real time to selections of templates.

The display data may be generated so as to be dependent on the proximity of the antenna relative to the one or more identified, detected source devices.

The process may comprise monitoring an environment to receive wireless data packets.

This may allow a user to interact with the process by selecting a defined behaviour of interest with inputs which select a template and viewing data which is responsive to the orientation of an antenna relative to one or more sources detected dependent on the selected template. This may allow a user to update a selection of a template in response to display data. In one example, a user may update a selection of a template in response to an absence of devices with behaviour defined by an incumbent template used to detect devices exhibiting alternative behaviour to the defined by the incumbent template.

This may allow a user to interact with the process by user-selected data.

This may allow a user to interact with the process by inputs at the user interface which initiate a log data generation.

This may allow a user to interact with the process by adjusting the orientation of the antenna.

The process may comprise receiving an antenna selection input at the user interface and switching between one or more antennas dependent on said input wherein the two or more antennas have different antenna gain.

The process may comprise receiving antenna selection data from the detection template and switching between one or more antennas dependent on said antenna detection data wherein the two or more antennas have different antenna gain.

The process may comprise applying one or more antenna selection rules defined by a detection template and switching between one or more antennas dependent on said one or more antenna selection rules wherein the two or more antennas have different antenna gain. A data store may be a queue.

Code of a template may define rules.

Code of a template may define actions.

Code of a template may be suitable to be associated with given packets in the one or more queues.

Two or more templates may provide a hierarchy of defined behaviours of devices to detect.

The template carries information on the behaviour of interest to be detected dependent on the template and the display data carries said information to display to the user the behaviour to be detected a template selected.

The template carries information which identifies to a user the behaviour of interest to be detected dependent on the template and the display data carries alert information to display to the user an alert indicating that the behaviour of interest has been detected dependent on the selected template.

A template in a hierarchy may be an abstraction of a template lower in the hierarchy. In one example a user may update the selection of a template in response to data displayed to update the selection to a detection template to a template in a lower order in the hierarchy to detect devices exhibiting more specific behaviours defined by the updated template or to a higher order in the template to detect sources which exhibit broader and/or abstracted behaviours.

This may allow a user to interact with the process by a combination of selections of template selections, initiation of log data generation, and adjustments to the orientation of the antenna. This may allow a user to carry out a process of detection and/or locating and/or identification of devices A template may comprise code defining two or more algorithms wherein the step of populating the one or more queues may comprise performing the two or more algorithms in time multiplexed processes running on a processor.

Code in a template may encapsulate and/or or groups a set of rules, each set defining a said behaviour of interest.

A template may further comprise reference data and pointers to one or more fields in a wireless packet structure.

A template may comprise code defining two or more algorithms and the step of populating the one or more queues may comprise performing the two or more algorithms in time multiplexed processes running on a processor.

A template may comprise two or more algorithms and the step of populating the one or more queues may comprise performing the two or more algorithms asynchronously on a processor.

One algorithm may use data generated and/or updated by another algorithm. The data stored or updated by one algorithm and used by another algorithm may be stored in a working memory of the processor. This may allow two or more algorithms to perform stateful processes. One algorithm may use and/or update data generated or updated by another algorithm. Selection at a user interface in a loop may allow a user to interact with the process of any of the paragraphs herein. Selection at a user interface in a loop may allow a user to interact with a stateful process involving two or more templates of any of the paragraphs herein.

The two or more algorithms may be performed on a processor of a microcontroller.

The two or more algorithms may be performed on a processor of a system on a chip.

The two or more algorithms may be performed on a processor of a microcontroller or system on a chip which is provided with a memory adapted to receive a volume of wireless data packets available to be received for a wireless network environment having defined characteristics.

The two or more algorithms may be performed on a processor of a microcontroller or system on a chip which is provided with a memory adapted to receive a volume of wireless data packets available in a promiscuous mode of the microcontroller or system on a chip.

A defined characteristic may be the network environment has thousands or more wireless data packets per second.

The steps of the process of any paragraph herein may be performed in a loop.

This may allow the display data to be interactive substantially in real time to adjustments of orientation of the directional antenna relative to one or more identified, detected source devices. Receiving inputs at the user interface indicating a selection of a detection template may be to allow the user to control the template determining populating the one or more queues with packets. This may allow the display data to be interactive substantially in real time to selections of detection templates. The process may provide an interactive display for a user to locate sources of wireless data packets wherein the display is dependent on selection of templates and adjustments of the orientation of the antenna.

The process may comprise a step of receiving inputs at the user interface to initiate data logging and writing log data in response to said inputs, wherein the log data carries information identifying a detected source device. Control inputs at the user interface may comprise inputs by a finger or digit of a user and/or voice inputs and/or inputs at a device linked to the device performing the process of any of the paragraphs herein.

The process may comprise a step of receiving inputs at the user interface indicating user-selected data, wherein the user-selected data is included in the log data.

The user-selected data may carry information indicating a location in the network environment of the identified, detected source device. In one example, a location indicated may be a floor of a building. In another example, location indicated may be a ceiling of the floor of a building. In another example, a location indicated may be a room in a building. In another example, a location indicated may be a corner of a room.

The user-selected data may carry information indicating a feature in the network environment of the identified, detected source device to allow log data to associate the identified, detected source device with the feature. In one example, a feature indicated may be a rafter. In another example, a feature indicated may be a flowerpot.

The user-selected data may carry information indicating a status of an exercise carried out by a user having used the process to locate and identify a detected source device. In one example, a status indicated may be that the device has been located. In another example, a status indicated may be a time when and/or location where a location exercise was paused.

The process may comprise providing an alert for a user when a detected source device is identified. This may provide an alert for the user that a source device location exercise could be commenced by the user. This may provide the user with an opportunity to adjust the orientation of the directional antenna to cause the display data to be updated to provide an interactive indication of the orientation of the directional antenna relative to the detected source device.

The step of receiving wireless data packets to monitor a wireless network environment may comprise receiving the wireless data packets using an antenna having a lower gain than the directional antenna.

The step of receiving wireless data packets to monitor a wireless network environment may comprise receiving the wireless data packets using a wide area antenna.

The step of receiving wireless data packets to monitor a wireless network environment may comprise receiving the wireless data packets using an omnidirectional antenna.

The display data may be generated dependent on a directional antenna, by receiving packets to generate the display data by a directional antenna.

In one embodiment, packets may be received by an omnidirectional, or low gain antenna, and used to populate the queue of wireless data packets from source devices detected using a template and substantially the same wireless data packets from substantially the same direction may be received by a directional antenna, or antenna with a higher gain, and used to generate the display or location feedback data. These embodiments, detection of wireless packets source devices is dependent on the template and generation of display or location feedback data is generated dependent on a directional antenna and also dependent on the template which carries rules applied to populate the queue of wireless data packets from detected, or characterised, wireless data packets source. Therefore, the display data or location tracking data is dependent both on a directional antenna and a detection template.

In one embodiment, a detection template may identify a type of wireless network security threat. Display data may identify that the detection is a type of wireless network security threat, and to display data by determining RSSI data for wireless data packets in the one or more queues and aggregating RSSI data for each source detected dependent on the template to provide display data at the user interface which changes with the orientation of the device relative to each source detected to provide the user with feedback data to use in locating the detected source, wherein the display data is updated substantially in real time to allow a user to interact with the display by manipulating the orientation of the device to locate the source of wireless packets which detects the threat, and wherein the detection template is selectable substantially in real time to allow the user to interact with the display by selections of detection templates. The display data may be tracking feedback data suitable to provide feedback to a user on the orientation of the directional antenna relative to a source device, and/or proximity of the antenna relative to source device to provide a user with feedback to orient and move the directional antenna to locate and/or track the source device.

Aspects of the invention provide an interactive device suitable for detecting and locating sources of wireless data packets, the devices exhibiting defined behaviour of interest in a wireless network environment, the device comprising:
 a network-monitoring module operable to monitor the wireless network environment to receive wireless data packets;
 a queue module operable to populate one or more queues for wireless data packets from the received wireless data packets, wherein the one or more queues are populated dependent on one or more detection template which defines a set of rules applied to data carried in received wireless data packets to detect whether one or more devices in the network are exhibiting behaviour of interest,
 a user interface operable to receive inputs indicating a selection of a detection template made at the user interface to allow an operator to select the defined behaviour of interest, operable to display information indicating said selected behaviour of interest to be detected, operable to display alert data carrying information indicating that a device in the network is exhibiting a behaviour of interest defined by the selected detection template, and operable to display data carrying information on a signal strength of wireless data packets from the same of one or more devices exhibiting the behaviour of interest defined by the selected template, and to display data carrying information on a signal strength of received wireless data packets from the same one of the devices, and wherein the user interface is operable to receive said inputs, update the template to a selected template and update data carrying information on said signal strength so as to provide the user with a substantially real-time interactive user interface which is responsive to selections of detection templates to determine behaviours of interest and responsive to movement of the device which changes the signal strength of packets from devices detected as exhibiting said behaviour.

The device may comprise a device-identifier module operable to extract device identifier data from the wireless data packets in the queue to identify said one or more detected source devices exhibiting said defined behaviour.

Aspects of the present invention provide a process for detecting sources of wireless data packets exhibiting defined behaviour of interest, the process comprising the steps:

receiving wireless data packets;
populating one or more memory buffers for wireless data packets from the received wireless data packets,
wherein wireless data packets received are added to the one or more queues dependent on a detection template, and
wherein a detection template comprises code defining one or more algorithms to define behaviour of devices to detect, the devices being sources of wireless data packets; and extracting device identifier data from the wireless data packets in the queue to identify one or more detected source devices exhibiting said defined behaviour.

The algorithm may be run using two or more processes running substantially asynchronously on a processor.

The process may comprise generating signal strength data carrying information on a signal strength of wireless data packets from the same of the one or more identified, detected source devices.

The signal strength data may be suitable to be displayed to a user.

The signal strength data may be suitable for transmission to an external control module.

Further aspects of the present invention provide a device operable to detecting sources of wireless data packets in an environment, the device comprising:

a module operable to monitor the wireless network environment to receive wireless data packets;
one or more queues operable to hold wireless data packets from the received wireless data packets,
a module operable to add wireless data packets received to the one or more queues dependent on a detection template,
wherein a detection template defines one or more rules, each applied to defined fields in a defined wireless packet structure;
a module operable to extract device identifier data from the wireless data packets in the one or more queues to identify one or more detected source devices;

a module operable to generate display data carrying information on a signal strength of wireless data packets from the same of the one or more identified, detected source devices,
wherein the display data is generated so as to depend on an orientation and/or proximity of the antenna relative to the one or more identified, detected source devices; and
wherein the device is operable to receive inputs indicating a selection of a detection template made to allow selection a detection of devices to be identified.

A detection template may define or more rules to define behaviour of a device.

A detection template may define or more rules to characterise a device.

A rule may be heuristic.

A rule may be probabilistic.

A rule may be stochastic.

A set of rules may be stateful.

The process may be performed on a microcontroller unit (MCU).

The process may be performed by a System on a Chip (SoC).

The microcontroller unit or System on a Chip may be provided with a stack for wireless data packets received in the step of receiving packets to monitor the network environment.

The microcontroller unit or System on a Chip may be provided with a stack suitable for wireless data packets received in a promiscuous mode of the microcontroller unit or System on a Chip.

The microcontroller unit or System on a Chip may be provided with a wireless interface accessible by a processor.

The step of generating a queue of wireless packets may be performed using two or more rules.

The step of generating a queue of wireless packets may be performed by one or more rules applied respective by one or more worker processes, wherein each worker process uses commands defined dependent on a selected detection template. Two or more worker processes may be run substantially concurrently.

A detection template may provide a group of rules associated with a given detection of source device.

The process may comprise displaying at the user interface template identification data indicating a type of detection of source devices which the detection template will make.

Template identification data may indicate a type of wireless network security threat.

Aspects of the invention provide a process for detecting sources of wireless data packets exhibiting defined behaviour of interest in an environment, the process comprising the steps:

monitoring the wireless network environment to receive wireless data packets;
populating one or more queues of wireless data packets from the received wireless data packets,
wherein wireless data packets received are added to the one or more queues dependent on a detection template, and
wherein a detection template comprises code defining one or more algorithms applied to the received packets to detect the behaviour of interest,
extracting device identifier data from the wireless data packets in the queue to identify one or more detected source devices exhibiting said defined behaviour;

generating display data carrying information on a signal strength of wireless data packets from the same of the one or more identified, detected source devices, wherein the display data suitable to be displayed at a user interface, and receiving inputs at the user interface indicating a selection of a detection template made at the user interface to allow an operator to select the defined behaviour of interest.

Aspects of the invention provide a server operable to store and transmit modules of code and/or data defining rues and/or actions operable on packets received by a device of any one of the preceding claims.

As used herein, the determiners "a", "an" and similar are used in an inclusive sense such that "a" does not preclude "another". For example, "a directional antenna" does not limit a device or process to having or using "one directional antenna" for precluding the device or process having or using "another directional antenna".

As used herein, the conjunction "and/or" used for example in reference to A and B is used to refer to: "A" or "B" or "A and B".

As used here and the term "rules" similar refers broadly to any definable criteria for logical operations includes for example "one or more rules" used in logic which relies upon states.

As used herein, a wireless data packet, wireless packet, wireless frame or packet is a unit of communication used by a digital network and is made of data fields having a structure defined by a specification. Data fields may be arranged in elements of the packet.

As used herein, "wireless network environment" refers broadly to any environment in which a network formed of two or more wireless devices may operate and includes environments in which in which other wireless devices not connected to the network may be operating.

As used herein, "environment" refers broadly to any environment in wireless devices may operate and includes environments in which in which other wireless devices not connected to any given network may be operating.

As used herein the term "code" is used to refer to any data which is capable of defining an algorithm or steps of a process to be performed, such as data defining instructions in a given computing or hardware implemented language.

As used herein the term "algorithm" refers broadly to a process or set of rules to be followed in calculations or other problem-solving operations, especially by a computer or processor, and may reference data, such as data defined for values of a filed or element of a wireless data packet.

As used herein the term "queue" is used to refer broadly to any type of data structure or implementation of the data structure in volatile or non-volatile memory where items of data or tasks sit in a predetermined order for processing of the items of data.

As used herein the term "store" refers broadly to any facility accessed or provided by a processor to store data, wireless data packets or code.

As used herein the term "abstraction" refers to making code and data in a template more versatile by simplifying how it is represented to a user. In given examples herein a hierarchy of templates with abstraction has templates lower in the hierarchy that are more specific examples of defined behaviour of interest and/or types of threat and/or types of devices exhibiting the behaviour of interest and/or processes a user would carry out using the device, or process of aspects of the invention.

As used herein the term "real-time" refers broadly to relating to a system in which data is processed in a given timeframe that it short enough that it is available virtually immediately as feedback to the user.

As used herein the term "module" refers broadly to any unit of software, hardware or combination of these that is described herein with reference to function or to by architecture, such as communication with other modules or devices, and does not preclude various alternative implementations of the functionality or architecture such as modules illustrated herein being divided or combined.

As used herein the term "loop" is used as a broad term for any loop in a process carried out by a processor such as a "while" loop, "if" loop, a loop involving a timer or a loop involving a counter to give some examples only.

As used herein the term "processor" is intended to refer broadly to any hardware, or virtual hardware, that is capable of executing instructions or code to carry out processes and includes mircocontrollers, microprocessors, central processing units, computers to and cloud computing services to name some examples only.

As used herein the term "substantially real-time" or similar refers broadly to any timeframe which serves the purposes of the user or external controller, such as a display being updated in a timeframe in which a user may move an antenna or device or may make control inputs, to name a few examples.

As used herein the term 'data structure' refers broadly to any programmatic scheme for organising the way a computer program, code executed by a processor or similar, accesses, processes, and stores data.

BRIEF DESCRIPTION OF THE DRAWINGS

Additional and further aspects of the present invention will be apparent to the reader from the following description of embodiments, given in by way of example only, with reference to the accompanying drawings in which.

Further aspects of the invention will become apparent from the following description of the invention which is given by way of example only of particular embodiments.

Best Modes for Carrying out the Invention

Figure 1:
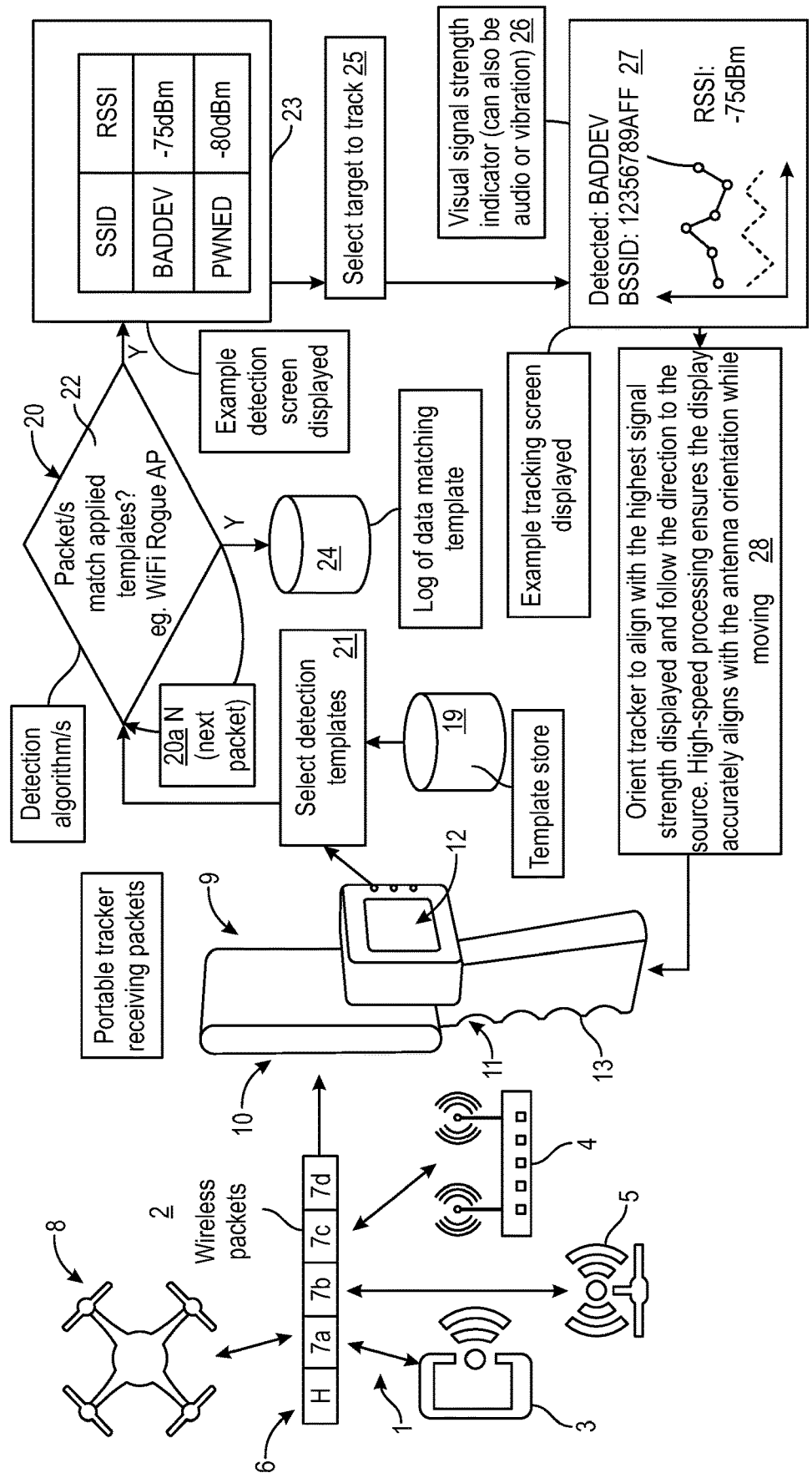
FIG. 1 depicts a wireless data packet network monitored by a device performing a process according to an embodiment of the present invention.

FIG. 1 illustrates a generalised example of an application of a process according to an embodiment of the present invention. FIG. 1 shows wireless network communications 1 operating in an environment 2 to allow a wireless device 3 to communicate with a wireless router 4 or an external access point 5 by exchanging wireless data packets 6.

The wireless data packet 6 is a unit of communication used in wireless network communications 1 and has a structure defined by a specification, typically having data elements 7a, 7b, 7c and 7d which also typically contain empty fields (not shown). The specification is typically provided by a network standard or protocol such as: standards recognised by the reader as Wi-Fi standards (such as the set included in IEEE 802.11, issued by the Institute of Electrical and Electronics Engineers), Bluetooth standards or other network standards.

FIG. 1 also shows an additional device 8 also exchanging wireless data packets 6 with other devices in the wireless network. In some example scenarios the device 8 may not be known to one or more of the other devices in the wireless network environment 2. In some example scenarios, a network operator or other party may want to detect the device 8. In this example, the device 8 is a drone. In this example also, the drone 8 has a malicious role in the network 1.

FIG. 1 also shows a detection device 9, which performs a process to detect devices, such as the drone 8 in this example, acting as sources of wireless data packets. As the reader will be aware the various devices 3 to 5 and 8 are typically both sources of wireless data packets 6 and recipients of wireless data packets 6 in their operations exchanging wireless data packets 6.

In this example, the detection device 9, and the process it performs, detect various devices such as the drone 8 by receiving wireless data packets 6 of which the devices are a source. In this example, the device 9 detects sources of wireless data packets that meet criteria defined in a detection template described in more detail below. In this example a template defines a given behaviour of interest that may be exhibited by devices operating in the network, such as by transmitting wireless data packets, to allow these devices to be detected, and/or defines algorithms which provide feedback to facilitate a user to perform a location exercise to locate the devices the detected as exhibiting the behaviour of interest defined by a template. In this example, the device 9 provides the user with feedback which facilitates a location exercise to be performed by a user. In this example also, the device 9 writes log data 24 in response to inputs to the device 9 by the user.

The detection device 9, shown in FIG. 1 is a portable device with an antenna 10 for receiving wireless data packets 6, from the network environment 2. In this example, the device 9 has a handle 11 providing a grip 13 for a user to use to manipulate the device to adjust the orientation and/or location of the device 9. The device 9 shown in FIG. 1 has a user interface 12. In this example, the user interface 12 provides a display which displays data to the user and provides controls to receive control inputs from the user to interact with the process performed by the device 9 and/or input data.

The brief illustrative process 20 is also shown in FIG. 1. As illustrated, the detection template is selected at step 21. The detection template, in this example, is a candidate detection template and is read from a template data store 19, storing a set of candidate detection templates. In this example, each detection template defines a type of threat that a device to be detected may represent. In this example, the threat is a "drone". In another example, a type of threat may be "rogue access point". In another example, the type of threat may be "Deauthentication attack". In this example, the detection device will detect devices, such as the drone 8, by applying the detection template, or a default detection template, to wireless data packets 6 received by the device 9 in the network environment 2.

As shown in FIG. 1, a detection algorithm, defined in code in the detection template from step 21, is applied at step 22 to detect various devices as exhibiting behaviour representing various threats, or other scenarios, or as characterised by the detection template. At 21a the step 21 is applied to a next packet.

In the example shown, the user interface provides a display at step 23 which lists all of the devices acting as sources of wireless data packets with information highlighting any devices that represent types of threats, or characterisations, represented by the detection template from step 21. These devices may be considered as exhibiting behaviour of interest. In this example, the detection information includes selectable text, a list and a colour code. In this example two detected devices are displayed with an SSID and a RSSI. In this example the SSID BADDEV is displayed with RSSI −75 dBm and SSID PWNED is displayed with RSSI −80 dBm.

In the brief exemplary process of FIG. 1, a user is able to select a detected device to locate.

The user interface 12 then provides a display at step 27 which displays location feedback data which is dependent on the orientation or location of the antenna 10 relative to the device, such as Rogue Access Point 5. In this example, the following is displayed at step 27 'Detected: BADDEV BSSID:123456789AFF' with an RSSI value of −75 dBm and a graph. This feedback data provides feedback in real-time to allow the user to conduct a location exercise involving reorienting and relocating the detection device 9 and interacting with the user interface 12 to locate the Rogue Access Point 5 in this example. In this example, the antenna 10 is a directional antenna and reorienting the detection device 9 relative to the Rogue Access Point 5, or the Rogue Access Point 5 moving relative to the detection device 9, will change the location feedback data displayed at the user interface 12.

At step 28 the device is oriented to align with the highest signal strength displayed and follow the direction to the source. High-speed processing ensures the display accurately aligns with the antenna orientation while moving.

Not shown in FIG. 1, the user is able to make inputs at the user interface 12. These inputs may initiate a change of the template selected at step 21. In other examples, the inputs may input a threat status of the device 8, such as Rogue Access Point 5.

In this example also, the inputs at the user interface 12 may initiate a logging operation in which the device 9 writes log data to a persistent data store 24. In this example, the log data identifies the device detected using the detection template selected at step 21 along with user selected data selected by further inputs at the user interface.

Figure 2:
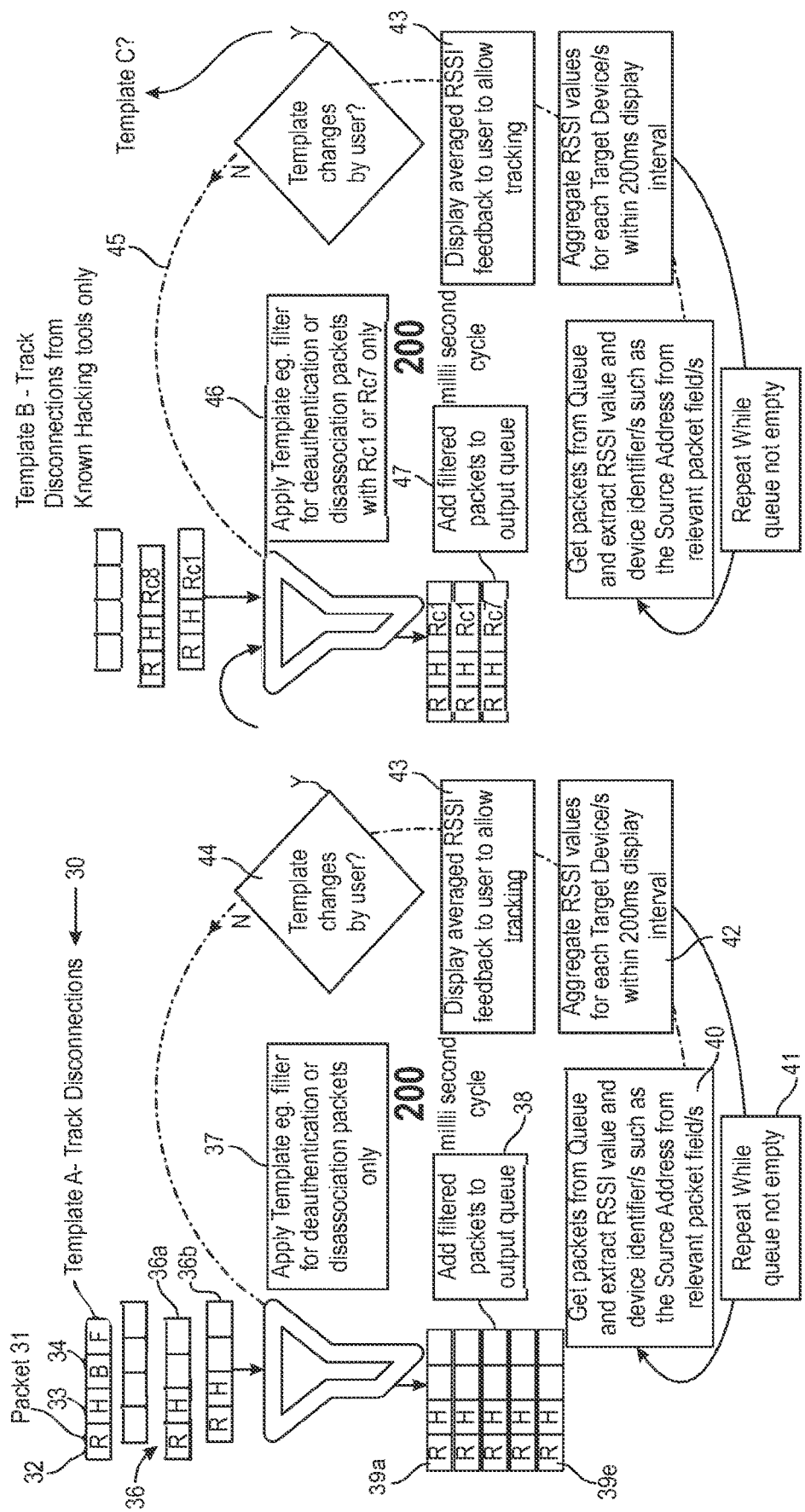
FIG. 2 depicts a process according to the embodiment of the invention of FIG. 1 of detecting devices which are sources of wireless data packets and providing a user with location feedback data.

FIG. 2 illustrates a device performing a process 30 of detection and location of sources of wireless data packets in a network environment according to a second embodiment of the invention. In this example, the process is used to detect and locate a source of wireless data packets using a continuous and updatable detection template. In the example shown in FIG. 2, Template A tracks disconnections, while Template B tracks disconnections from known hacking tools only.

The illustration for this process diagram will reference hardware of the embodiment of FIG. 1 using the same reference numerals.

FIG. 2 shows an exemplary wireless data packet 31. The wireless data packet 31 has elements defined by a specification given in a standard. The elements contain fields (not shown) also defined in the specification of the given standard.

In this example, each packet has an appended Radiotap header 32 which contains a Received Signal Strength Indication (RSSI) (not shown), and a MAC Header 33 containing the source address field in which data identifying the source of the given wireless data packet is carried. The wireless data packet 31 illustrated also has a packet body 34 (B) which contains a Reason Code (RC) field.

FIG. 2, illustrates multiple wireless data packets 36 which are received by detection device 9 while monitoring the network environment 2. These wireless data packets received by the device 9 potentially number thousands per second and are received by a microcontroller or System on a Chip (not shown) in the device 9 which, in this example, is provided with a promiscuous mode function and a stack of wireless data packets received in the promiscuous mode. In this example a deauthentication packet 36a and dissociation packet 36b are shown.

FIG. 2 depicts a step 37 of applying algorithms applicable to specified fields of received wireless data packets 36 to define rules. The rules defined are applied to specified fields, in the wireless data packets 31, as defined by a specification of a wireless networking standard. In this embodiment the algorithms are defined by code in a detection template to detect whether any device communications in the network environment 2 are exhibiting behaviour of interest. In this particular embodiment the template has pointers to specify fields of wireless data packets. The pointers allow the algorithm to apply to data carried in given fields of the wireless data packets having a specified structure, such as by a WiFi standard for example. In this specific embodiment the detection template contains reference data used by the algorithms.

FIG. 2 also depicts a queue 38 of wireless data packets which has been populated, or generated, with wireless data packets 39a to 39e dependent on the rules of the detection template applied to specified fields applied to received packets 36. For the purpose of illustration, the process of populating the queue may be referred to as a filtering step. The reader may recognise the population of the queue 38 as performing a characterisation on each device which is a source of wireless data packets 36. This characterisation is performed by populating the queue only with packets from source devices which have a characterisation defined by the template used at step 37. In this example, it is the devices acting as sources of the wireless data packets 36 that are characterised because the template applies groups of rules that may apply to a number of packets from the given source.

In step 40, depicted in FIG. 2, the RSSI and device identifier data is determined for each wireless data packet 39 in the queue. In this example, the RSSI value is determined dependent on a directional antenna 10 so that the RSSI value will depend on the orientation of an antenna 10 of the device relative to the device which is the source of a packet in which the RSSI is determined.

The steps 40 and 42 are repeated, depicted by loop 41, while queue 38 is not empty.

In step 42, the RSSI values of each detected device, detected as exhibiting the behaviour of interest as defined by the selected template, are aggregated to provide an aggregate for each detected device. In this example, each distinct device which may have been detected by population of the queue 39 as a separate indication is displayed 43 so that the display data and indication provided is generated dependent on both detection template and the directional antenna.

Step 44 depicts an opportunity for a user to make inputs at a user interface 12 to select a template. At this step the template may be changed for another template to detect wireless data packet sources exhibiting a different type of behaviour, being of a different type, or having a different characterisation.

If the detection template is not changed at step 44, the process continues to detect wireless data packet sources using the same template. In this example, the steps 37 through 44 are performed in an algorithmic loop. In this example, the algorithmic loop has approximately a 200 milliseconds period. This allows the displayed data generated at step 43 to be updated every 200 milliseconds and provide substantially real-time display data which depends on the orientation of the antenna 10 relative to detected and identified source device and also depends on the template selected, or loaded as a default.

If at step 44, user inputs indicate the selection of a different detection template, the same process is performed, although using a different template 46 to populate the queue 47 to detect wireless data packets source with correspondingly different characteristics.

Figure 3:
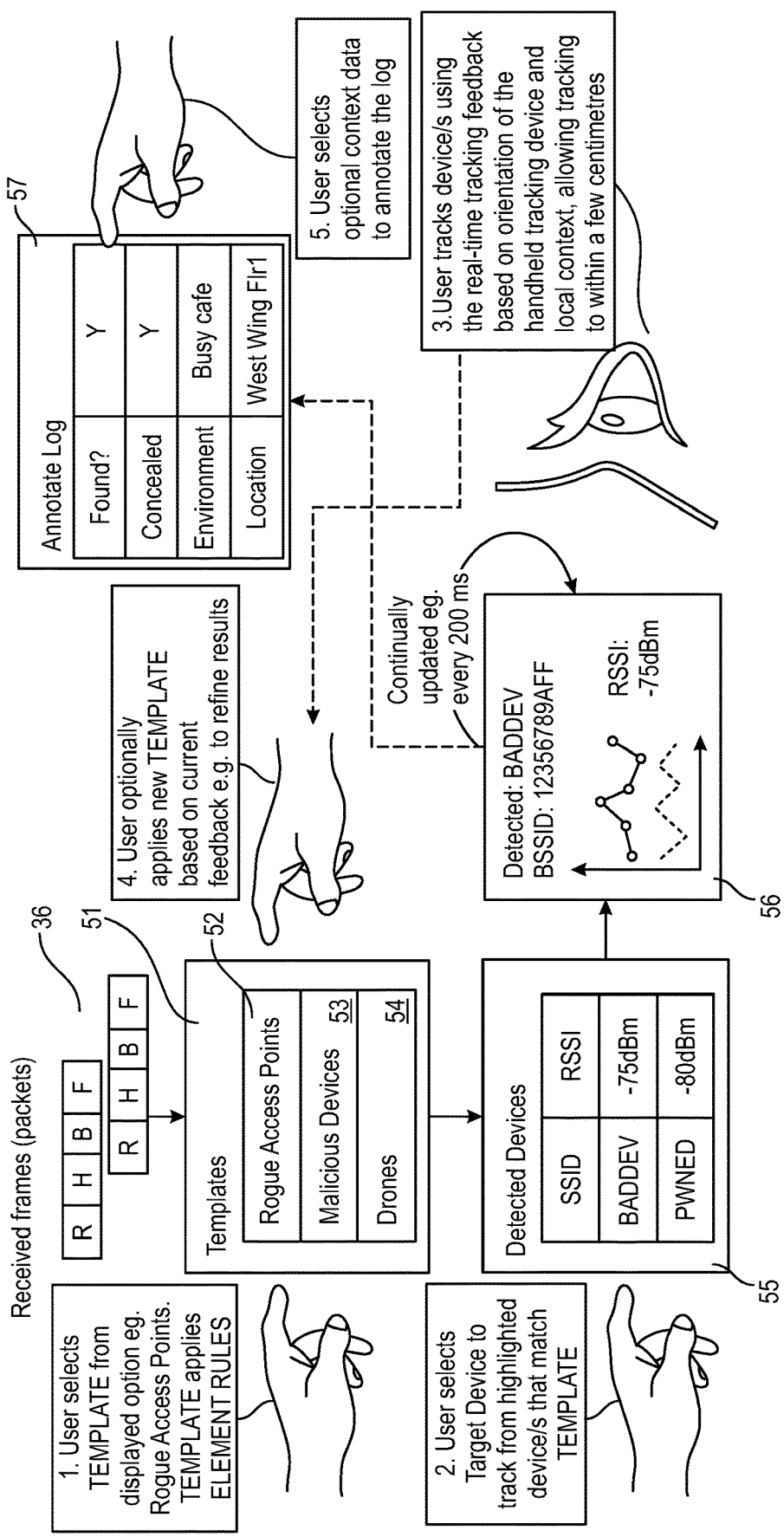
FIG. 3 depicts an exemplary operation of user interface of a device performing a process according to the embodiment of FIGS. 1 and 2.

FIG. 3 depicts an operation using the device or process of the present invention for detecting and locating a device exhibiting a behaviour of interest device 9 to further illustrate the process performed by the device 9.

The illustration for this process will reference hardware of the embodiment of FIGS. 1 and 2 using the same reference numerals.

A number of wireless data packets 36 are depicted as received by the device 9 by monitoring the network environment. A user interface 12 provides a display 51 of a number of templates that a user may select by inputs at the user interface 12. In this example, three different templates may be selected. Each of these templates is represented on the display by template data carrying information recognisable by user as a behaviour of interest such as a type of threat, or other characterisation of wireless data packets source. By selecting the type of threat, for example, the user controls the device 9 to select an appropriate template which causes the device 9 to detect devices acting as the given type of threat, or exhibiting behaviour detected by rules carried in the respective template. In this example information identifying three types of threat, source characterisation, or behaviour are presented as candidate templates for selection by the user. In this example, the types of threat are Rogue Access Points 52, Malicious Devices 53 and Drones 54.

The device 9 then applies rules to fields of received wireless data packets as defined by the selected template by steps described above. The user is presented with display data indicating a list of identifiers of devices detected using the selected template. In this example, any devices which are the source of wireless data packets in the queue of data packets 38 populated by applying rules defined in the selected template, applied to fields defined in the selected template are identified as detected. The list of detected devices is dependent on the detection template selected and used. The user interface presents data carrying information for list of the devices detected. In this example, two detected devices are shown 55. This is two devices which exhibit behaviour matching the criteria represented by the selected detection template. In this example, the displayed data includes data identifying each detected device. In this example also, the displayed data indicates an aggregated RSSI value which is an aggregation of the RSSI values determined for each packet with common device identifier data extracted from packets in the queue 38. In this example, the interface 12 allows the user to select one or more of the detected devices. The user of this example will carry out a location exercise to locate the selected one of the devices detected. The device 9 displays data 56 to provide the user with feedback on the relative orientation of the antenna 10 to the selected detected device. This display data is updated approximately every 200 milliseconds to provide substantially real-time feedback to allow the user to progressively reorient or relocate the device 9 to discover the location of the selected detected device which is the source of packets from the queue 38 with device identifier data indicated by the user selection of the detected device.

Within the 200 millisecond cycle, the user is able to select a detection template and if the selection changes, the updated selected template will determine what devices are detected. In this example, a set of selectable templates may represent a hierarchy of threats of source devices so updated selections may represent a refinement or narrowing down the type of threat, or characterisation, of source devices to detect.

The reader will appreciate that the devices have been detected and identified by the user's selection of a template without other prior knowledge or data being entered by the user. The reader will appreciate that the user was able to select a template which applied a set of detection rules that may not necessarily have been understandable by a human user. The rules may have been too numerous or may have involved stateful processes, or time dependent processes to name a few examples.

The user interface 12 receives inputs to allow a user to input user selected data. In this example the user selectable data 57 includes text which identifies a location where the device was detected and identified and selected by the user and was discovered after a device location exercise. In this example, user selectable data includes a status of a location exercise, such as found Y/N. In this example also, the user selectable data includes context data such as concealed Y/N and data describing a physical environment of the wireless network such as busy café.

The user interface 12 also allows the user to initiate the generation of log data and writing up of the log data to a persistent memory media (not shown). In this example, the memory store is a removable memory chip. In this example, the user selected data is included in the log data along with data identifying the device detected by applying rules of a selected template.

The reader will appreciate that the device 9 provides a substantially real-time interactive device to detect devices in a network environment and locate selected detected devices, where the user is able to interact by movement of the device and/or the devices antenna (not shown), selections of behaviours to update a selected template, and by viewing substantially real time, 200 ms in this case, information indicating the orientation and/or relative location of the device 9 to a selected, detected network device.

Figure 4:
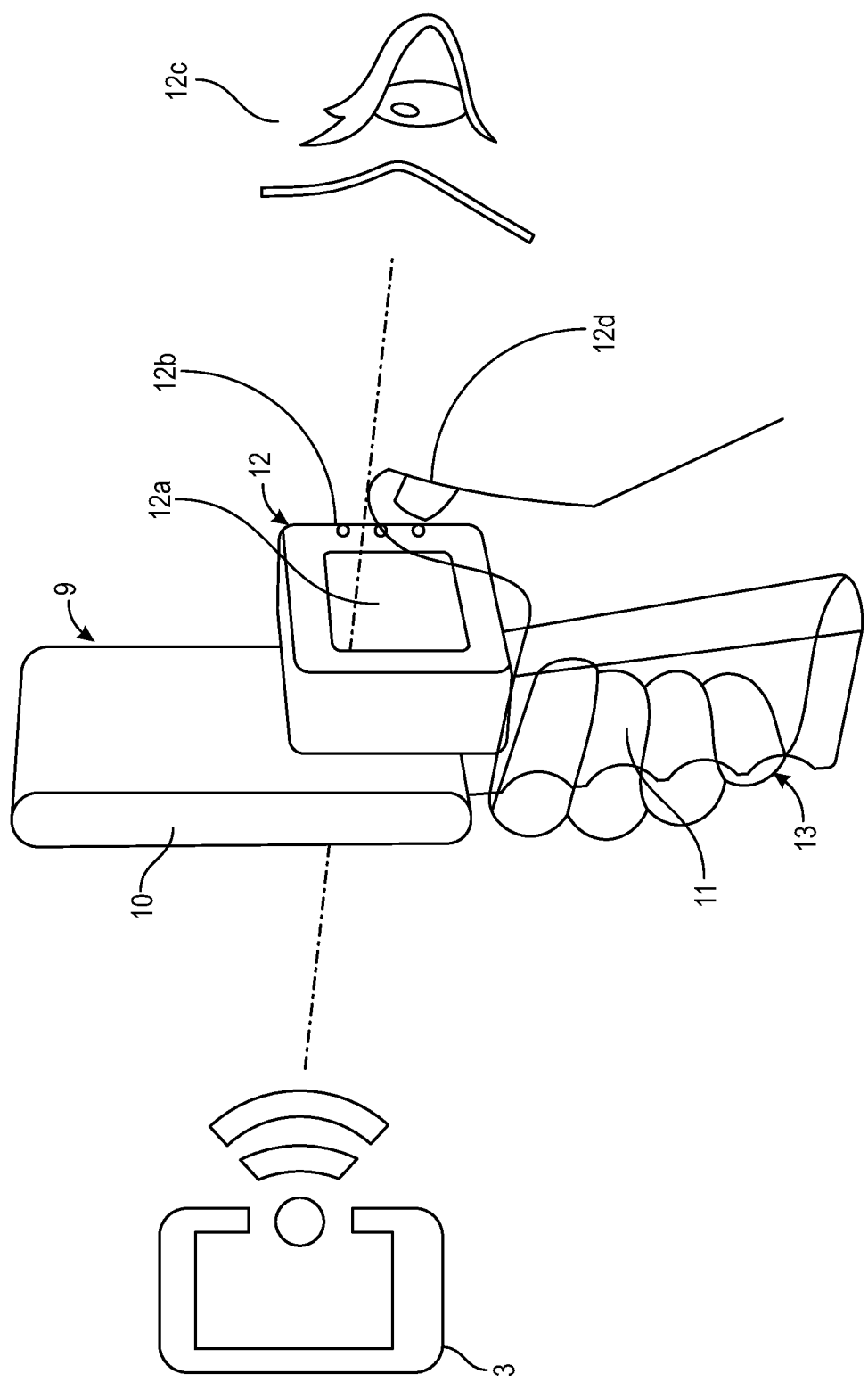
FIG. 4 shows in more detail the device of the embodiment of FIGS. 1 to 3.

FIG. 4 shows a closer view of the device 9 shown in FIG. 1. This diagram will reference hardware of the embodiment of FIG. 1 using the same reference numerals. FIG. 4 shows a device 3 which has, in this example, been detected as a device in the network environment 2 which is acting as a source of wireless data packets that represent a behaviour of interest as defined by a detection template, or one or more algorithms defined by code and reference data in the template acting on data packets received by the device 9. A user interface 12 displays display data at a screen 12a, such as data identifying a number of devices which exhibit threat behaviour and feedback data providing feedback on the orientation of the directional antenna 10 relative to device 3. The user interface 12 also provides buttons or touch-sensitive inputs 12b, in this example, which receive control inputs made by the user. The user interface of this example is intended for a direct line of view 12c for the user. In this a set 12b of three buttons is located in a position for operation by the thumb digit 12d of an operator holding a grip 13 of a handle 11 provided for the device. The handle 11 allows the user to manipulate the device 9, with one hand in this case, to move the device while the feedback data allows the user to identify a direct line of sight to the device 3. At the same time the buttons are in reach of the user's thumb 12d to make control inputs, such as to select a new template, select one of a set of detected devices for a location exercise, enter status data identifying a status of a location exercise, and/or to enter data to be included with log data for the exercise. In one example of the use of the device 9, a user is able to monitor the display 12a for alert information indicating that behaviour of interest by one or more devices in the network environment has been detected with a default template acting on packets received via an omni-directional antenna. The user is able to then use buttons 12b to select a specific device from a list of devices exhibiting the behaviours of interest represented by information at the display. The user is able to then use buttons 12b to select a new template suitable for locating the selected device. The template includes instructions which cause the device to switch to a directional antenna to receive wireless data packets and to allow information at the display generated using RSSI data for the received packets from the same device to provide feedback on the orientation of the antenna 10 relative to the device 3. The user is then able to use the handle 11 to adjust the orientation and location of the device 9 to locate the device 3. At the same time the display 12a and buttons 12b allow the user to view feedback updated in a loop, such as every 200 ms, and allows interactive control inputs, such as updated selections of templates. The display 12a and buttons also allow the user to indicate a status of the location exercise, such as paused, ceased, completed, or device located. The display 12a and buttons 12b also allow a user to select data to be stored with in log data stored for the exercise, such as context data for the location or description of the device detected and located.

Figure 5:
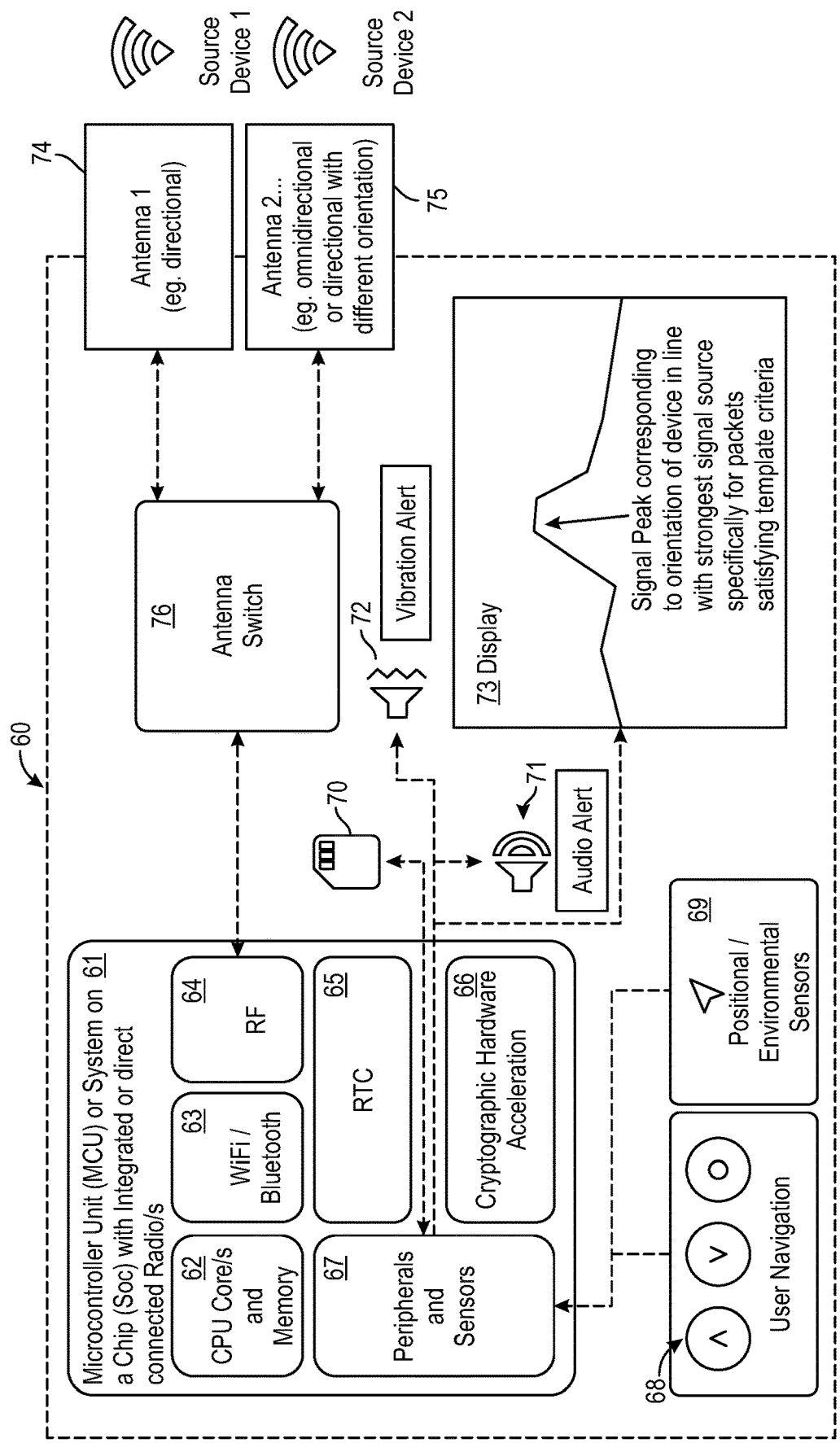
FIG. 5 gives a functional block illustration of a device for performing the process of another embodiment of the present invention.

FIG. 5 depicts a circuit board diagram and functional block diagram of a detection and location device 60, performing a process according to another embodiment of the present invention. The process diagram will be described with reference to hardware of the embodiments of FIGS. 1 to 3.

In this embodiment a microcontroller unit (MCU) or system on a chip (SoC) 61 with integrated or direct connected radio chips as shown. The MCU/SoC 61 has a CPU core module with integrated memory 62. MCU/SoC has a Wi-Fi/Bluetooth module 63, radiofrequency and (RF) module 64, RTC module 65, cryptographic hardware acceleration module 66 and peripherals and sensors module 67.

FIG. 5 shows a set of controls 68 for the user interface 12, which in this case receives inputs allowing a user to navigate and select displayed data for selection. The controls 68 communicate with the peripherals and sensors module 67. In this embodiment, the device has positional and environmental sensors 69, which also communicate with the peripherals and sensors module 67 of the MCU 61.

Also communicating with the peripherals and sensors module 67, is a persistent storage device in the form of a removable memory chip 70. An audio signal generator in the form of a speaker 71 is also provided and communicates with the peripherals and sensors module 67. In this embodiment a vibration actuator 72 is provided and communicates again with the peripherals and sensors module 67. This provides an alert to the user. A display 73, is also provided to present data generated by the MCU 61. In this particular embodiment, the device 60 is provided with two antennas of differing gain to provide differing coverage of the network environment for receiving wireless data packets. In this example, a directional antenna 74, which is analogous to the directional antenna 10 of FIG. 1, is provided. An omnidirectional antenna is also provided 75. The directional antenna 74 and omnidirectional antenna 75 communicate with the RF module 64 of the MCU 61 by an antenna switch 76. In this particular embodiment, the directional antenna 74 is removable to allow the device 60 to be concealed.

In this example the display 73 displays a plot of a signal with a peak that corresponds to an orientation of the detection and location device with the strongest signal source specifically for packets satisfying template criteria. The reader may recognise the displayed data as dependent on the template selected and the location and/or orientation of the device.

Figure 6:
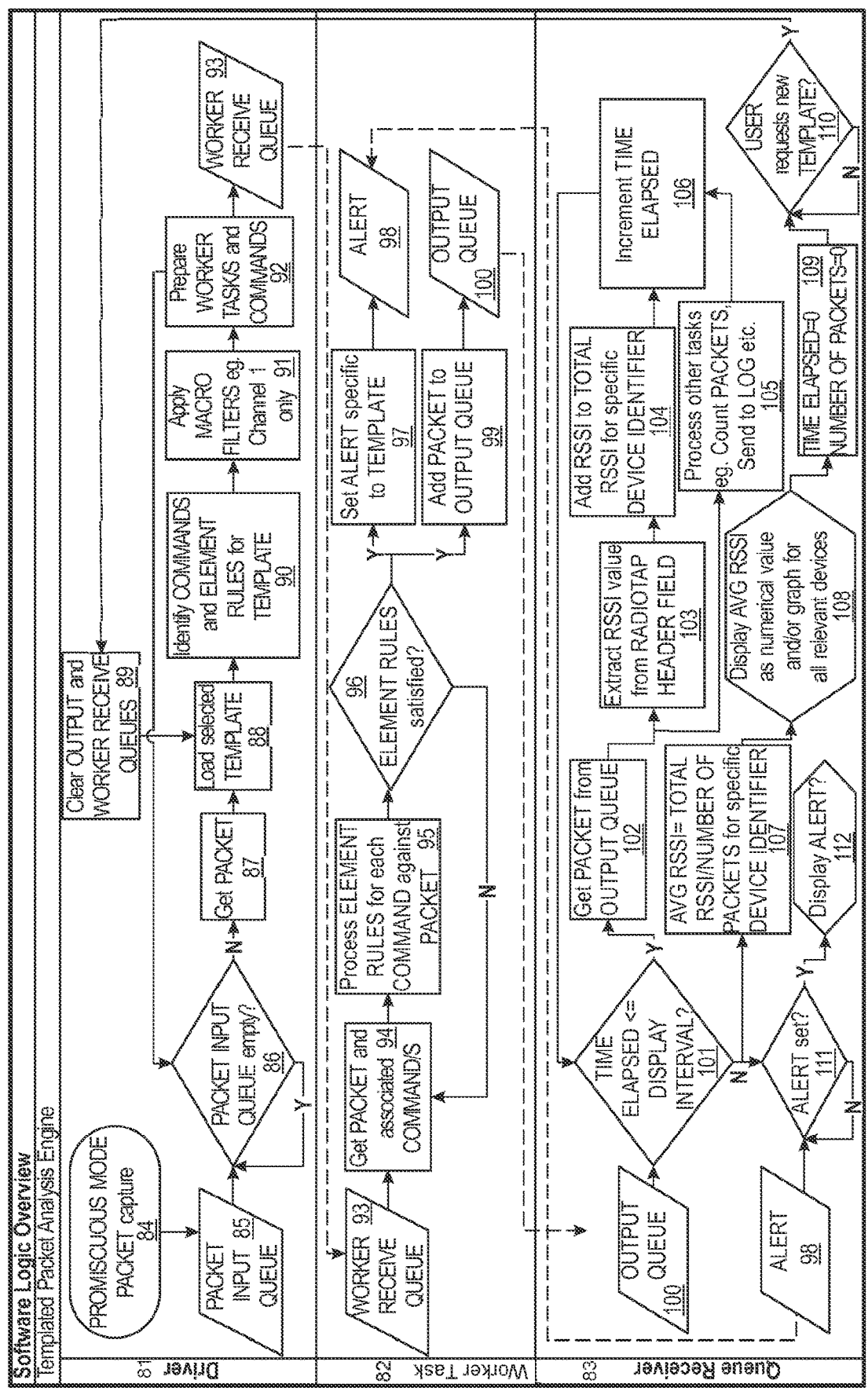
FIG. 6 depicts a process according to the embodiment of FIG. 5.

FIG. 6 depicts in more detail a process 80, carried out by detection and location device 9 according to another embodiment of the present invention. The illustration for this process diagram will reference hardware of the embodiment of FIGS. 1 to 3 using the same reference numerals.

The process 80 is performed by the MCU depicted in FIG. 6 by three process modules: a driver 81, a worker task 82 and a queue receiver 83. The reader may recognise the steps illustrated as operations or sets of operations.

At step 84 wireless data packets are captured by monitoring the wireless network environment by a microcontroller unit (MCU) or SoC (not shown) and stored in a packet input queue stack at packet input queue step 85. The wireless data packets are captured and stored at steps 84 and 85 in a promiscuous mode of the MCU. Promiscuous mode in this embodiment provides access to all Wi-Fi packets detected by the Wi-Fi radio (RF in block FIG. 5) on a specified channel. In promiscuous mode, the Wi-Fi controller passes all traffic it receives to the central processing unit (CPU) rather than passing only the frames that the controller is specifically programmed to receive, frames sent specifically to the MAC address of the device. In other words, it allows viewing of all Wi-Fi traffic, regardless of the device it was sent to. The raw packet received by the Wi-Fi radio has the Relative Signal Strength Indication (RSSI) value generated by the Wi-Fi controller appended as part of the Radiotap Header field. The term PACKET from hereon in denotes a PACKET including the Radiotap Header field.

At the packet input queue step 85 a 'First In First Out' (FIFO) queue is created to store the incoming packets captured in sequence. A queue is required to manage the processing of packets asynchronously in parallel with other processes, without losing any packets due to peak processing demands. The potential high volumes of packets received can be many thousands of packets per second in a typical environment and an asynchronous or multi-thread enabled design is employed to analyse packets in substantially real-time without loss.

At the PACKET INPUT QUEUE empty step 86 a check of the PACKET INPUT QUEUE 85 is performed to see if any more packets have been received and require processing before initiating DRIVER processing. The check is repeated while the QUEUE 85 is empty and after every packet is passed by the Driver to a WORKER RECEIVE QUEUE 93. The DRIVER processing remains idle until packets are available in the PACKET INPUT QUEUE 85. In the Get PACKET step 87 a PACKET is retrieved from the PACKET INPUT QUEUE 85.

If the input queue of packets received from the network environment, such as done in promiscuous mode, a get PACKET step 87 is performed.

In a Load selected TEMPLATE step 88 inputs from a user at the user interface indicates a USER selection of a TEMPLATE to be loaded. The USER-selected, or a default, TEMPLATE is loaded by the DRIVER. The TEMPLATE contains a set of COMMANDS (actions) and ELEMENTS (rules) to apply to the packet.

In a Clear OUTPUT and WORKER RECEIVE QUEUES step 89 the OUTPUT and WORKER RECEIVE QUEUES are cleared prior to applying the new template, ensuring the QUEUES only contain packets relevant to the current TEMPLATE.

In an Identify COMMANDS and ELEMENT RULES for TEMPLATE step 90 commands and rules are identified, collated ready to be packaged in 92 for processing by worker tasks. The description here refers to ELEMENT RULES as rules that apply to packet fields (or elements in a packet) as defined in a wireless packet structure defined by a specification such as provided by a wireless network standard.

In an Apply MACRO FILTERS step 91 a macro filter is applied. While COMMANDS and ELEMENTS can be used for essentially any criteria, pre-filtering at a MACRO level reduces any processing overhead required for WORKER TASKS. For example, applying a MACRO FILTER for a specific channel can significantly reduce the number of packets required for further processing.

In a prepare WORKER TASK/S and COMMANDS 92 the COMMANDS and ELEMENTS are identified ready for processing against each packet and packaged as a binary structure along with the PACKET ready for adding to the WORKER QUEUE.

In a WORKER RECEIVE QUEUE 93, COMMANDS, ELEMENTS and PACKETS are stored ready for processing by an assigned WORKER TASK. In this example, the WORKER RECEIVE QUEUE is a First-In-First-Out (FIFO) queue holding the packaged COMMANDS, ELEMENTS and PACKETS ready for processing by an assigned WORKER TASK. Multiple WORKER TASKS can run in parallel based on the COMMAND/S set, for example, 'logging selected packets' while 'checking for suspicious attributes'.

In a Get PACKET and associated COMMAND/S step 94 the packaged PACKET, COMMANDS and ELEMENTS are extracted from the WORKER RECEIVE QUEUE ready for processing.

In a process ELEMENT RULES for each COMMAND against PACKET step 95 TEMPLATE COMMAND/S and ELEMENT/S are applied to the PACKET.

In an ELEMENT RULES satisfied? decision 96, only PACKETS that satisfy the TEMPLATE are processed further. If not satisfied, the next PACKET and COMMAND/S are retrieved from the WORKER RECEIVE QUEUE at step 94 and added to an output queue. The reader will recognise the packets added at step 94 to the output queue as populated dependent on the selected or default template.

At a Set ALERT specific to TEMPLATE step 97 an alert specific to the template is generated. This will typically include data that identifies a type of threat of a detected source of packets, or characterisation made, using the TEMPLATES if the specific template includes ALERT criteria. For example, if the number of PACKETS of a certain type exceeds a pre-defined level, an ALERT will be set and flagged as feedback to the USER.

At an ALERT step 98 an alert is included in a signal at the user interface. The ALERT of this embodiment can include a DISPLAY, Audio or Vibration ALERT type or combination thereof. The ALERT, for example, displaying a red message at the bottom of the screen, will be set ready for displaying at the appropriate screen and time interval. In this embodiment the ALERT is specified by, or generated dependent on, the TEMPLATE.

In an Add PACKET to OUTPUT QUEUE step 99 the PACKET is added to the OUTPUT QUEUE. In this example, the PACKET is added to the queue without COMMANDS or ELEMENTS. The output queue is populated with packets from sources detected using rules in the selected template. This may also be recognised as the queue being generated with packets from sources detected as exhibiting behaviour specified in the rules of the applied template. The OUTPUT QUEUE 100 in this example is a FIFO queue used to hold the PACKETS that pass the TEMPLATE processing.

In a TIME ELAPSED <=DISPLAY INTERVAL? Decision 101, if the designated time interval, such as 200 milliseconds, has not been exceeded, continue processing for TRACKING purposes.

In a Get PACKET from OUTPUT QUEUE step 102 a packet is taken from the OUTPUT QUEUE and passed on for further TRACKING processing.

In an Extract RSSI value from RADIOTAP HEADER FIELD step 103 following step 102 the RSSI value is extracted from the RADIOTAP HEADER FIELD of packets from the output queue to determine a useful metric or value for signal strength analysis or to indicate signal strength. Typically, the higher the value, the closer the source device is.

In an Add RSSI to TOTAL RSSI step 104 RSSI values of PACKETs are aggregated for specific DEVICE IDENTIFIERs. The signal strength or device proximity indication value is aggregated for each device detected by adding the value for each PACKET. Each RSSI value is progressively accumulated in the designated time period for one or more specific DEVICE IDENTIFIERS that are being TRACKED. For example, the BSSID value of an Access Point extracted from Beacon PACKETS may be used as the source device identifier. At this point wireless packet source devices detected using rules specified in a default or selected template are identified and accumulated for use in generating display data.

In a Process other tasks step 105, other tasks may be performed. In this example, they are performed in parallel. In this example, any of the following may be performed: Count PACKETS, Send to LOG. In addition to processing the RSSI data for TRACKING, other tasks such as packet counting and logging, are initiated relevant to the TEMPLATE and USER choices identified by inputs at the user interface.

In an Increment TIME ELAPSED step 106, the time elapsed is incremented as each PACKET is added to the OUTPUT QUEUE. Once the time elapsed reaches the pre-define time interval, the required TRACKING data accumulated can be processed. Tracking data has been generated and this embodiment is used to generate display data or location-feedback data for a user to use in a device locating exercise.

In an AVG RSSI=TOTAL RSSI/NUMBER OF PACKETS step 107, an average signal strength value is determined for PACKETS with the same DEVICE IDENTIFIER. For feedback processing, the average RSSI value is calculated to ensure TRACKING data is smoothed over the designated time interval in this embodiment. Otherwise, normal RSSI variations may produce misleading results.

In a Display AVG RSSI as numerical value and/or graph for all relevant devices 1088, the AVERAGE RSSI values are displayed as a substantially real-time view, updated every designated time interval, such as 200 milliseconds. As a graph, this provides a moving display indication providing direct USER feedback of the signal strength (source device proximity) based on the orientation and proximity of the TRACKING device to the source device.

At a TIME ELAPSED=0, NUMBER OF PACKETS=0 Reset step 109 counters are set back to 0 ready for the next time interval.

At a USER requests new TEMPLATE? decision 110 a user selection of TEMPLATE is received. If the USER requests a new TEMPLATE, clear the OUTPUT and WORKER RECEIVE QUEUES 89, load the selected TEMPLATE 88 and continue TEMPLATE processing. If not, keep checking for USER inputs at the user interface.

At an ALERT SET? decision 111 a check is made whether an ALERT has been flagged. If so, Display ALERT step 112 is performed. If not, the process repeats this check at display intervals.

At a Display ALERT step 112 ALERT data is generated for display, or ALERT audio is played and/or the ALERT vibration is set to provide feedback to the USER that a source device with criteria or characteristics defined by the TEMPLATE has been detected.

Table 1 illustrates the logic of an example set of rules and actions used by a further embodiment of the present invention. The rules corresponding to the logic illustrated are defined by a detection template and applied to data carried in specified fields of a wireless data packet of standard.

TABLE 1

Example Rogue Access Point Template

Get packets and apply template:
Filter for 'Management' Type, 'Beacon' Sub-type frame
Extract SSID, BSSID, AUTH, RSSI, channel, payload length, beacon interval
IF SSID padded with spaces -> flag 'suspect'
IF not on Safe List -> flag potential 'suspect'
IF on Rogue List -> flag 'suspect'
IF SSID has specific characteristics -> flag 'suspect'
IF BSSID has specific characteristics -> flag 'suspect'
IF payload length has specific characteristics -> flag 'suspect'
IF beacon interval has specific characteristics -> flag 'suspect'
IF beacon count above threshold in defined time interval -> flag 'suspect'
IF timing and RSSI are identical to other beacons -> flag 'suspect' IF specific sequence of packets corresponds to known attack eg. New AP followed by Deauthentication -> flag 'suspect'
Derive overall risk rating and generate appropriate ALERT
Calculate average RSSI of common source for tracking Table 2 gives illustrative descriptions of criteria applied by rules of two exemplary templates according to a further embodiment of the present invention. The two of these exemplary templates are applied to fields in elements described in table 2 of a specific wireless data packet structure. In the examples, two templates are illustrated, one to detect sources of rogue or malicious access points and another to illustrate malicious Wi-Fi packets.

TABLE 2

Example Template Elements

| Category | Element Criteria | Description | Field/State to which Rule Applied | Rule |
|---|---|---|---|---|
| Rogue or Malicious Access Points | SSID padded with spaces | Hacking tool generated SSIDs are often padded with spaces to fill the full 32 byte field e.g. ESP8266 Deauther - Beacon flood | SSID | Spaces in SSID > X |
| | Not on Safe List | Unexpected APs in specific location | SSID and BSSID | SSID and/or BSSID not equal to safe list |
| | On Safe List but different attributes | Matching SSID but not other credentials e.g. different BSSID. Note some organisations duplicate SSIDs when extending WiFI coverage | SSID, BSSID and Authentication | SSID matches safe list but different BSSID and/or Authentication |
| | On Rogue List | Known Rogue Access Points eg. pwned | SSID, BSSID and Authentication | Matches Rogue List entry |
| | Geographic inconsistency | Unexpected Access Points in specific location e.g. StarBucks WiFi detected but no StarBucks in area | SSID and Location | SSID does not match safe list for location |
| | SSID has specific characteristics | Duplicate, misspelled variation of known Access Point, Unexpected duplicate (not WiFi extension) | SSID | More than 1, Similar but not same SSID as Safe list |
| | BSSID has specific characteristics | Duplicate, unknown/ random or OUI indicates unusual manufacturer. BSSID pattern consistent with beacon flooding or similar attack | BSSID | OUI derived from BSSID not equal to sanctioned manufacturer If auto-generated patterns, likely Beacon Flooding |
| | Frame Body length has specific characteristics | Hacking tools such as airbase-ng generate pre-templated payloads that can be identified | Beacon Frame Body length | Length consistent with auto generation hacking tools |
| | Beacon interval has specific characteristics | The beacon interval can vary with devices. If the beacon interval is different than expected for a safe | Beacon interval | Interval inconsistent with safe list |

TABLE 2-continued

Example Template Elements

| Category | Element Criteria | Description | Field/State to which Rule Applied | Rule |
|---|---|---|---|---|
| | Connected devices | Access Point, may indicate a Man in the middle attack If a suspicious Access Point has connected devices, it may indicate data leakage from the organisation | Packet Source and Destination | If devices connected to Rogue AP, high risk |
| | Access Point RSSI variance | Any variance over time can indicate a moving device or intermittent operation consistent with hacking tools. | Beacon RSSI | RSSI variance outside threshold |
| | Beacons with same or similar RSSI | Hacking tools often generate multiple beacons known as beacon flooding. This can often be identified by checking if the RSSI value is the same or similar for beacons i.e coming from the same device | Beacon SSID, BSSID, RSSI and location | Multiple Beacons with same RSSI but not at same Safe listed location |
| | Beacon volume and timing | If the beacon volume exceeds a specific threshold in a given time interval, this can be an indication of beacon flooding or unusual Access Point activity | Beacon BSSID, SSID count and time interval | SSID/BSSID count exceeds threshold for time interval |
| Malicious WiFi Packets | Deauthentication/ Disassociation packet volumes above normal | These packets occur normally in a network, however, the rate is usually small, consistent with devices leaving the network. Any excessive volume could constitute an attack, either a DOS attack or an attempt to capture handshake packets when reconnecting | Deauthentication/ Disassociation Packet Count | Count above threshold for specific time interval |

Referring to embodiment illustrated with reference to FIG. 2, the reader may recognise the step 37 populating the queue 38 as identifying wireless data packet source devices that have a characterisation defined by the given detection template, and the reader may recognise the detection template as a characterisation template.

Further and additional embodiments will now be illustrated.

In various further embodiments the user display allows log entries at the user interface to be limited to specific outputs determined by a detection template.

In various embodiments a template may provide a grouping of multiple algorithmic elements spread across multiple asynchronous worker tasks, producing multiple outputs such as one or more of the following: state information, attribute filtering, caching of intermediate results for further processing by another worker task, collation, counting, sequencing, and timing. In various embodiments a complete set of algorithms and rules may be required to be processed in a substantially real-time manner to allow effective detection and location of devices exhibiting complex behaviours in specific wireless communications. The algorithms are not limited to any specific rules and can be created as required in the constraints of the programming language itself.

In some example embodiments an example detection is of a 'man in the middle attack'. This would include the detection of a device acting as an Access Point with specific characteristics such as those described in a 'Table 1' defined in data in a detection template combined with the detection of unusual Deauthentication packet types and volume in a specific time interval after the Access Point was detected. Steps in an algorithm defined by code in a template including attribute checking, sequence checking, time elapsed and packet counting are required to detect the malicious device. This also needs to be continually updated substantially in real-time, to support user interaction necessary in a tracking and/or locating exercise performed by a user.

In various embodiments a template encapsulates or groups a set of algorithms to detect devices exhibiting target wireless characteristics or behaviours of interest. It is not possible for a user to interactively control the individual algorithmic elements and logic steps that exist in a template to generate display or log outputs in a timely manner. The template provides a means to facilitate control by a user by user-selection of templates. The reader may recognise the template in some embodiments as abstracting the underlying complexity of a set of algorithms.

Various embodiments are implemented with a microcontroller unit (MCU) or system on a chip (SoC) with integrated modules for promiscuous mode monitoring of a network environment and a central processor for running other processes described herein.

In these embodiments, the MCU or SoC allows the device, such as device 9, to be low powered. This core chip draws approximately 120 milliamps, compared to the lowest powered Raspberry Pi SoC (the Zero W), that draws approximately 250 milliamps for the same process. These embodiments have advantages in portability, battery life and size.

In various of these embodiments, close coupling of a CPU with memory and direct access to a wireless stack, such as a Wi-Fi stack for example, minimises bottlenecks and allows very low latency and high efficiency in processing packets.

In various embodiments, direct access to a Wi-Fi, or other wireless controller in promiscuous mode is also highly efficient.

In various alternative embodiments a directional antenna may be formed of two or more antennas with processing modules able to determine the relative position of packets and/or radio signals carrying packets to provide a signal that is dependent on the orientation of the two or more antennas to a source device.

In various embodiments, a low gain antenna or omnidirectional antenna is provided by multiple antenna components. In various of these embodiments, an antenna component is provided by directional antennas. In various of these embodiments, the antenna components may be mounted to cover complementary fields of view.

In various embodiments a rule may be defined by the template comprising data which carries information defining a logical operation. In various embodiments any logical operation known to the reader as suitable for given applications may be used and may include rules defined using any conditional statements and/or logical operators or other operators or statements used in computing such as IF, IF-ELSE, GREATER THAN, GREATER THAN OR EQUAL, LESS THAN, LESS THAN OR EQUAL, EQUAL, NESTED IF, AND, OR, NOT, NAND, NOR, XOR, XNOR, WHILE LOOPS, FOR LOOPS, regular expressions, probabilistic rules or comparisons, heuristic rules, rules defined by weightings and/or biases and any combination of these examples or other examples.

Various embodiments of the invention provide a direct chip interface without requiring external drivers or intermediary components which might slow down operation. Some embodiments provide greater than 20,000 packets per second processing capacity. This may exceed the capacity of dedicated fixed network Intrusion Detection System dedicated appliances eg. Sonicwall NSA 2400=12,500 pps.

Embodiments of the invention apply detection algorithms by a multi-threaded asynchronous analysis engine running with worker processes off a processor and allow high speed parsing of packets through complex algorithms to satisfy templates while still providing substantially real-time feedback to the end user and using minimum memory. The reader may appreciate that even dedicated high-speed laptops running *Kali*-Linux and conventional platforms for monitoring wireless network environments using very simple filters cannot provide this rapid feedback to the user. Even creating a graph in some wireless network monitoring platforms, for example, may still only update every second.

Embodiments of the present invention provide detection by a multithreaded asynchronous engine with a display refresh interval of 200 milliseconds. The reader will appreciate that these embodiments provide advantages in the speed, accuracy and efficiency of detecting and locating a source of wireless data packets exhibiting behaviour of interest.

In various embodiments a loop or cycle less than 200 ms may be used, such as 100 ms. In other embodiments a loop or cycle more than 200 ms may be used, such as 500 ms.

Various embodiments of the present invention provide an ability to dynamically switch to new templates while detecting and locating devices or wireless data packets exhibiting behaviour of interest. Various embodiments templates are not just simple filters, or tables, but are modules encapsulating potentially complex logic and algorithms. For example algorithms defined by code in detection templates may apply logic to packet timing, counts, content, sequence, RSSI variance etc. This complexity may be advantageous in identifying specific packets related to behaviour which is potentially malicious or is a custom requirement.

Various embodiments of the invention are implemented using a microcontroller or a system on a chip allowing device weights to be potentially less than 225 grams with single-hand ergonomic operation and over 10.5 hours endurance continuous scanning and locating on a 3 Ah battery.

Various embodiments of the invention provide efficient detection and data useful in location exercises requiring the use of a directional antenna, 360 degrees horizontal and vertical freedom of movement and real-time feedback.

Embodiments of the invention provide real-time feedback display which provides a unique perspective when locating a source. These embodiments provide a display, or display data, with a current signal strength line graph reading along with a trend line of recent readings. This may provide a mechanism to quickly and intuitively determine if the current orientation of the antenna is pointing closer or further away from the source interactively as the orientation changes. For example, a natural peak in the line graph above the trend line may accurately indicate the direction of a source and/or an approximate distance of the source.

In various alternative embodiments a behaviour of interest defined by a template may not necessarily be a threat. In one example, a behaviour of interest may be related to performance metrics for the device. In one example, a behaviour of interest may be related to diagnostics for the device. In one example, a behaviour of interest may be related to maintenance for the device, such as assessing whether maintenance is required or such as scheduling maintenance. In another example, the behaviour may relate to movement and/or location of a device, such as moving outside a defined region or moving outside a defined velocity envelope.

In various alternative embodiments the modules, or functional units illustrated herein by way of example are combined and/or divided as known to the reader to be suitable for given applications of the invention.

In various alternative embodiments the steps provided herein illustrated herein by way of example are combined and/or divided as known to the reader to be suitable for given applications of the invention.

In specific alternative embodiments an RF module of the device, such as exemplified as Wi-Fi/Bluetooth module 63, radiofrequency or (RF) module 64 of FIG. 5 are provided on a separate board such as may be connected for example by Universal Serial Bus (USB) connection or similar.

In various embodiments queues or similar other than FIRST-IN-LAST out may be used. For example, FIRST-IN_LAST out ques may be used.

Various embodiments may have positional sensors to provide positional data to augment user-selected data, other inputs or log data.

A user may thereby be able to manipulate the device in response to tracking feedback data to locate the source of wireless packets and orient the device relative to the threat using updated tracking feedback, where the threat for which real tracking feedback data displayed is for a threat as identified by template data and template rule, and the user is able to enter location/tracking status data to be stored in the log in association with the template data at the end of a tracking operation performed by an operator of the device.

Various embodiments of the invention detect sources of wireless data packets using templates which are identifiable and selectable by a user to display a detection of source devices using rules which are not identifiable by user. For example, rules may apply to sequences of packets received where the sequences have complexity, progression of states in memory of a microcontroller or system on a chip, or timing which a user is not able to recognise. In the preceding description and the following claims, the word "comprise" or equivalent variations thereof is used in an inclusive sense to specify the presence of the stated feature or features. This term does not preclude the presence or addition of further features in various embodiments.

In various alternative embodiments, a queue is any storage known to the reader as suitable for given applications of the embodiments of the invention, and may include First-In-Last-Out Queues, data structures stored in volatile memory, and memory buffers.

In various embodiments, alert data is generated dependent on a source exhibiting behaviour being detected and this alert data identifies a template.

In various embodiments, alert data is generated dependent on a source exhibiting behaviour being detected and this alert data is specified, or generated dependent on a template.

In various embodiments, alert data is generated dependent on a source exhibiting behaviour being detected and this alert data identifies a template and this alert data is specified independently of a template.

In various embodiments, rules are applied to elements of wireless data packets.

In various embodiments a detection template populates one or more queues or other memory with a subset of packets received my monitoring a network environment.

In some embodiments a template carries information on the behaviour of interest to be detected dependent on the template and the display data carries said information to display to the user the behaviour to be detected a template selected. The display 23 of this embodiment also displays data which carries information on the behaviour that a given template, such as a currently selected template, detects. In one embodiment the data is provided by the template selected. The display 23 also displays data which carries information to provide an alert to indicate that a behaviour has been detected dependent on a given template.

The template carries behaviour information which identifies to a user the behaviour of interest to be detected dependent on the template and the display data carries alert information to display to the user an alert indicating that the behaviour of interest has been detected dependent on the selected template. In one embodiment a display 23 also displays data which carries information to provide an alert to indicate that a behaviour has been detected dependent on a given template.

In various further embodiments the antenna switch is controllable by a user. These embodiments allow a user to switch between two or more antennas of different gain. In one example the antennas are switched from an omnidirectional antenna to a directional antenna. In one example the omnidirectional antenna may be used to receive wireless data packets to detect whether sources of the wireless data packets exhibit behaviour of interest. In one example this behaviour may be defined by a template. In one example the behaviour may be defined by rules applied to information carried in data fields in a defined filed and/or frame of a wireless data packet. In one example the behaviour may be defined by rules applied to information carried in data stored in working memory, such as a worker process, of the processor of the device. In this example the information defines a state, such as in a state machine. In one example the state may define a count. In one example a rule increases a count each time a packet with given attributes is received, another rule updates a timer and another rule determines whether the count is greater than a defined number at the end of a time interval.

In one example the rules applied by code determine whether a number of Deauthentication/Disassociation Packets, greater than a defined number are received in a defined time interval. In this example the template carries data which is displayed as an alert to indicate to an operator that a DOS attack may be occurring. The operator then has the option of selecting a new template which applies rules to display signal strength data for a device identified as a source for Deauthentication/Disassociation Packets to allow the operator to use the detection device to perform a location operation.

An example use case for a process according to an embodiment of the invention for detecting sources of wireless data packets exhibiting defined behaviour of interest in a wireless network environment is as follows.

A default template is loaded on the detection device.

The device receives wireless data packets from a network environment via an omnidirectional antenna, applies rules applied by executed template code to identify sources of wireless data packets that exhibit behaviour of interest, and displays alert data indicating the behaviour defined by the default template. In this example, display data indicating the proximity of the detected device is displayed. Inputs from an operator are then received, indicating a selection of another template which applies rules and/or operations to detect a different behaviour of interest. Display data providing an alert is displayed at the user interface. In this use case the template applies operations to maintain use of the omnidirectional antenna to receive wireless data packets.

Inputs from an operator are then received, indicating a selection of yet another template which applies rules and/or operations to detect a different behaviour of interest. Display data providing an alert is displayed at the user interface. Display data carried in the template also identifies information that a human operator can recognise, such as the common name for a type of threat represented by the detected behaviour of interest. In this use case the template applies rules which detect a behaviour in a lower order in a hierarchy of behaviours. In this example, the previous template detects sources of packets exhibiting behaviour of a general threat and the newly selected template applies rules to detect a more specific example of the generalised threat. The reader will appreciate that the rules may not be recognisable. For example, it may apply rules that involve states of a state machine or statistical calculations.

Inputs from an operator are then received, indicating a selection of another template which defines rules and operations useful for the operator to apply a location operation to locate the detected device.

The operator then manipulates and moves the detection device, which is hand-held and has a directional antenna in this example, while observing display data at the user interface to ultimately locate the device detected as exhibiting behaviour of interest, such as a given threat. Inputs are then received at the user interface to initiate a logging operation to record data on various aspects of the detection and location operation such as the device, behaviour of interest as well as data input by the operator.

Embodiments of the invention allow complex filters, provided by templates to be applied interactively in real-time thereby facilitating the detection and tracking of specific behaviours such as WiFi attacks as they occur.

In various embodiments a wireless packet is a wireless frame.

In some embodiments a template detects behaviour of interest of a device by identifying any transmission that has a defined packet structure. In one example a device according to the invention or process according to the invention monitors an environment to receive transmissions and detects whether the transmissions received conform to any packet structure and/or a specific packet structure. In one example, the device or process receives transmissions from an area and detects whether the transmissions conform to a packet or frame structure to detect whether a device, such as a WiFi device or phone, is present.

In various embodiments the device or process according to the invention detects devices which are not connected to a given wireless network but may be a source of transmissions that may be received in a given network environment.

In various alternative embodiment to that illustrated as illustrated with reference to FIG. 1 provide a tracker device which allows a user to orient tracker to align with the highest signal strength displayed and follow the direction to the source. In these embodiments high-speed processing ensures the display accurately aligns with the antenna orientation while moving.

Additional embodiments have multiple antennas to receive packets for location of a device detected. In various of these embodiments separate RSSI's may be determined for packets from the same device received by different antennas. In various of these embodiments the two or more resulting RSSI values for the same detected device may be used as metrics to determine orientation and/or location of the detected device. In some examples two RSSI's may be used to determine trilateration data for the detected device. In various embodiments the multiple antennas are provided on a detection and location device. In other embodiments the multiple antennas are located with given configurations relative to each other as known to the reader to be suitable for given applications, such as spaced apart and mounted on walls to name one example.

Various embodiments of the invention are implemented using code and/or data stored on a computer or processor readable medium which define instructions which configure a computer or processor to provide operational modules as described and illustrated herein.

Various embodiments of the invention are implemented using code and/or data stored on a computer or processor readable medium which define instructions which configure a computer or processor to perform steps, algorithms or processes modules as described and illustrated herein.

Various embodiments of the invention are implemented using computers, micro-processors, processors or other devices or systems capable of carrying out instructions with a working memory to store instructions defining structure or processes as described or illustrated herein.

Various embodiments of the invention provide a server or other storage facility which stores a set of templates which define rules and/or actions to be applied to wireless transmissions received to detect behaviour of interest or determine data to allow location of devices detected.

Various embodiments or aspects the invention has files in place of templates.

Various or aspects the invention has objects in place of templates.

Various or aspects the invention has code or data modules in place of templates.

Various embodiments have templates, files, objects or code or data modules that are suitable to characterise behaviour and/or operations of wireless devices.

Various embodiments or aspects of the invention have templates, files or objects or modules stored, and/or loaded in any format, language and/or protocol known to the reader as suitable for given applications.

In various embodiments the template is a transferable module of code and/or data which defines a behaviour of interest or characterisation recognisable by a user to assist the user to detect and/or locate devices.

In various embodiments a device and/or server communicating with the device template provides a set of candidate templates or modules to provide the user with a choice of templates or modules to select.

In various embodiments detection templates are applied in a loop or a cycle.

In various embodiments the user interface may be remote or external, such as provided over a data or communication link of any type known as suitable to the reader for given applications.

In various embodiments template control logic may be provided at a equivalents to the user interface known to the reader.

Embodiments of the present invention provide processes for characterising and providing data suitable as feedback for a user locating sources of wireless data packets in a wireless network environment, the process comprising the steps of:
- monitoring the wireless network environment to receive wireless data packets;
- populating one or more queues of wireless data packets from the received wireless data packets,
- wherein wireless data packets received, are added to the one or more queues dependent on a detection template, and
- wherein a characterisation template defines one or more rules, each applied to defined fields in a defined wireless packet structure to detect one or more source devices acting as sources of wireless data packets in the queue;
- extracting device identifier data from the wireless data packets in the queue to identify one or more detected source devices;
- generating user-feedback data carrying information on a signal strength of wireless data packets from the same of the one or more identified, characterised source devices, the user-feedback data suitable to generate a communication signal at a user interface,
- wherein the generating display data comprises receiving packets using a directional antenna to provide display data which is dependent on an orientation and proximity of the antenna relative to the one or more identified, detected source devices; and
- receiving inputs at the user interface indicating a selection of a characterisation template made at the user interface to allow an operator to select a characterisation of devices to be identified.

The user-feedback data may be suitable to generate a communication signal comprising vibration at the use of interface.

The user-feedback data may be suitable to generate a communication signal comprising audio signal at the user interface.

Embodiments of the invention provide a process for detecting sources of wireless data packets in a wireless network environment, the process comprising the steps:
- monitoring the wireless network environment to receive wireless data packets;
- populating one or more queues of wireless data packets from the received wireless data packets,
- wherein wireless data packets received are added to one or more queues dependent on a detection template, and
- wherein a detection template defines one or more rules, each applied to defined fields in a defined wireless packet structure, to detect one or more devices sources of wireless data packets;
- extracting device identifier data from the wireless data packets in the queue to identify one or more detected source devices;
- generating display data carrying information on a signal strength of wireless data packets from the same of the one or more identified, detected source devices, wherein the display data is suitable to be displayed at a user interface,
- wherein the display data is generated dependent on a directional antenna to provide display data which is dependent on an orientation and/or proximity of the antenna relative to the one or more identified, detected source devices; and
- receiving inputs at the user interface indicating a selection of a detection template made at the user interface to allow an operator to select the detection template.

Embodiments of the invention provide a device suitable for use in detecting and locating wireless transmission sources, the device comprising:
- a memory buffer operable to store wireless packets received by monitoring a wireless network environment;
- memory operable to store one or more detection templates carrying information defining one or more rules applied to one or more fields of a wireless packet as defined by a standard;
- a processor operable to detect one or more sources of the received wireless packet dependent said one or more stored rules applied to defined elements and/or fields in a wireless data packet structure to identify one or more detected wireless packet sources;
- a user interface operable to show display data, the display data generated for wireless packets from one or more of the detected sources of received wireless packets, wherein the display data is generated dependent on the orientation and/or proximity of the device relative to a detected source of wireless packets;
- wherein the user interface is operable to receive control inputs at the user interface to allow a user to select the detection template from a candidate set of detection templates;
- and wherein the user interface is operable to receive log-control inputs at the user interface to allow a user to initiate writing of log-data; and
- a log data generator operable to generate log data comprising data identifying a wireless source.

The device may comprise the grip to allow the user to grip and reorient the device while observing the display.

The user interface may be operable to control in substantially real time, the detection template, the orientation of the antenna, the initiation of log data writing and additional user-selected data included in the log data. Two or more selectable templates may be provided in a hierarchy of templates. This may allow control of the template selection to refine characteristics of sources used to populate one or more queues which the display data is generated dependent on. This may allow a user to refine characteristics of sources of packets used to generate display data.

Further embodiments provide a process performed by a device suitable for use in detecting and locating wireless transmission sources, the process comprising the steps of:
- monitoring a wireless network environment to receive wireless packets;
- reading a detection template carrying information defining one or more rules to be applied to one or more fields of a wireless packets as defined by a standard;

applying the one or more rules to the received wireless packets to detect one or more wireless packet sources; generating display data for an interactive user interface, wherein the display data is generated dependent on wireless packets from the detected wireless packet sources, and wherein the display data is dependent on the orientation of the device relative to the detected one or more sources of wireless packets to allow the user to interact with the device by adjusting the orientation and/or proximity of the device relative to a detected source; receiving log-control inputs at the user interface to allow a user to initiate writing of log-data; and writing log data comprising data identifying a wireless source.

The process may comprise receiving a user input at the user interface to allow a user to select a detection template from a candidate set of detection templates.

The process may be performed by a portable device.

Generating display data may comprise reading data from packets received by a directional antenna to introduce the dependence of the display data on the orientation and/or proximity of the device relative to a detected source of wireless packets.

In one example, location comprises a direction of a detected wireless packet source relative to the device.

Context data may comprise location data, indicating a position of a source of wireless packets in a network environment.

The steps of detecting one or more sources of wireless packets and generating display data may be performed in an algorithmic loop.

This process may allow a user to locate sources of wireless packets dependent on a template detecting wireless packets sources, and on display data which is received by a directional antenna to indicate an orientation and/or proximity of the directional antenna relative to the one or more detected wireless packet source. This may allow a user to locate sources of wireless packets of a given detection without having information which identifies the given source of wireless packets.

This process may allow a user to update a selection of the detection template.

The step of receiving control inputs at the user interface to allow a user to select the detection template may be performed in the same algorithmic loop as detecting one or more sources of one of the wireless packets and generating display data so that selection of detection templates is interactive in substantially real-time. This may allow a substantially real-time display of display data at the user interface in response to selections of detection templates and/or manipulations of a device running the process relative to detected sources of wireless packets.

This process may allow a device to provide an interactive interface, which allows a user to interact with a device running the process by manipulating the device to change the orientation and/or proximity of the device relative to a source of wireless packets which has been detected as being of interest, for example, using a detection template to locate the device by observation of display data and manipulations of the device and to update the selection of a detection template in response to the interaction of display data and manipulations and/or in response to discover the position or location of a source of wireless packets. In one example of an interactive use-case, a user of the device running the process may be provided with an interactive display in which display data changes in response to manipulations by the user of the device to change the orientation and/or proximity of an antenna relative to a wireless data packet source which has been detected dependent on a detection template and may update this selection of the detection template in response to observations of display data and manipulations of the device. In this example, the user may not have to provide any information or data which identifies a source of wireless data packets, but may only need to indicate a type of detection, such as a given type of threat to a network, by selection of the template. In one example, observations of the display data in response to manipulations of the device and/or observations of the network environment, such as sighting a wireless packet source, may inform the user's selection and/or updated selection of a detection template. In one example, observations of display data in response to manipulations may be prompted by detection data, such as an alert generated by the process.

The process may comprise generating detection data carrying information on a detected, identified wireless data packet source device using a detection template. The detection data may indicate an alert. The alert may be suitable for display at the user interface. The detection data may comprise data included in the log data.

The process may comprise receiving log-data inputs at the user interface to allow a user to indicate context data to be included in log data.

The process may comprise populating a queue of wireless packets from sources detected using one or more detection templates.

The steps of detecting one or more sources of wireless packets may comprise initiating one or more worker processes running on a microcontroller and/or system-on-a-chip and loading commands for one of the worker processes, wherein the commands are loaded dependent on the detection template. This allows the one or more rules of a given detection template to be implemented by a worker process.

One or more worker processes running on the microcontroller and/or system-on-a chip may have commands loaded dependent on a common detection template. This may be to allow two or more rules defined by a detection template to be run in parallel. This may be to allow two or more rules defined by a detection template to be run concurrently.

A detection template may comprise data identifying a specific detection of wireless packet sources. This specific detection may carry information recognisable by a user as a type of detection. A given specific detection may be a given type of threat to a network recognisable by users. This may allow templates to group rules which can be recognised by users as identifying given threats to a network and/or other detections of wireless packet sources.

The process may be performed on a microcontroller or system on a chip which provides promiscuous mode for monitoring a wireless packet network. The process may be performed on a microcontroller or system on a chip which provides promiscuous mode monitoring of wireless packets.

The process may be performed on a microcontroller or system on a chip which provides buffering of wireless packets received by monitoring the network environment and which provides a processor capable of running the worker processes. The processor may be operable to run one or more worker processes.

The process may comprise populating a queue of wireless packets detected by worker processes dependent on detection templates.

The process may comprise populating a queue of wireless packets received from the one or more detected wireless packet sources.

The step of generating display data may comprise extracting device identifier data from packets received from detected sources of wireless packets detected. This may comprise extracting device identifier data from packets in said queue of packets from detected sources of wireless packets.

The generated display data may carry information on the signal strength of wireless packets received from detected wireless packet sources. In one example, locating a detected source of wireless packets may comprise a direction and a relative distance as indicated by signal strength of wireless packets received from a detected source of wireless packets.

The generated display data may carry information on the signal strength of wireless packets from each detected wireless packet source separately so that the display data indicates a signal strength of packets from each individual detected wireless packet source. Said information on the signal strength of wireless packets may be an aggregation of information on the signal strength of a number of packets from the same detected wireless packet source.

The display data may indicate said aggregation of information on the signal strength for two or more detected wireless packet sources.

The step of monitoring the wireless network environment may be by receiving wireless packets by an antenna which has a lower gain than the directional antenna used to generate the display data.

The process may comprise switching between said antenna which has a lower gain than the directional antenna and said directional antenna.

A detection template may define one or more rules for one or more elements of a wireless packet as defined by a given standard.

A detection template may define one or more rules for one or more fields of a wireless packet as defined by a given standard.

Detection of a source of wireless packets may be whether wireless packets are from a wireless source detected as suspicious.

A detection template may define one or more rules each applied to one or more fields for wireless packets as defined by the standard, wherein the one or more rules detect a wireless packet source dependent on behaviour identified by sequences of packets carrying given data in said defined one or more fields.

The detection template may define operations that apply one or more rules. One or more rules may be applied each applied to one or more fields for wireless packets as defined by a standard, wherein the one or more rules detect a wireless packet source dependent on specified data carried and said defined one or more fields. One or more rules may be applied to data carried in frames, wherein the frame is defined by a wireless data packet standard. One or more rules may be applied to update states provided by executed code. This may allow stateful operations to be performed. In one example, rules may be applied to a counter for events that have been observed. In some examples the counter may be updated according to a rule. In some examples a rule may be applied to a timer. In one example one rule may update a counter. In one example another rule may be applied to the count value of the counter. In another rule may reset the counter, such as after a time period expiring.

In some examples a detection template may include code to define one or more algorithms. In some examples a detection template may include code to define one or more algorithms. In some examples algorithms and/or operations may apply one or more rules.

A detection template may define multiple rules which are grouped into rules applied to defined fields of wireless packets. In some examples a field is an element of a frame as defined by a standard. Groups of rules may be identified by a detection name which identifies to the user the given detected behaviour and/or detected event. In some examples, rules in a group of rules are applied by a processor substantially concurrently. In other examples, code defining algorithms and/or rules may be instantiated and linked with given wireless data packets received from a network environment. In some examples, places in a queue of data packets and/or data carrying information on data packets may be linked to instantiated code and/or algorithms to apply one or more rules. In these embodiments a packet and/or data carrying information on a packet may be acted upon by the rule applied by the instantiated code and/or algorithm linked to the packet and/or data carrying information on a packet.

Embodiments of the invention may allow groups of rules, of which two or more of the rules are applied by a processor concurrently, to allow substantially real-time detection of sources of wireless packets. This may allow a template identifiable by a user as able to identify and detect sources of wireless packets, such as a threat for example, to apply rules which may not be identifiable by user and/or may not be identifiable by user in real-time. This may also allow a detection template which is recognisable by user to identify a given detection to be updated with additional and/or substituted rules. These rules may be updated in response to data and/or control inputs at the user interface.

Further embodiments provide a wireless system operable to detect and locate one or more wireless transmission sources, the system comprising a portable locating device operable to be manipulated by a user to orient and/or locate the device relative to a wireless device detected; a user interface operable to display data to a user and allow a user to input control operations; the user interface is operable to display tracking feedback data to provide feedback to an operator on the orientation and/or proximity of a device relative to the one or more wireless transmission sources;
    wherein the tracking feedback data is updated dependent on one or more data fields stored by the system;
    wherein the tracking feedback data is updated dependent on one or more rules applied to the one or more data fields;
    and wherein tracking feedback data is updated dependent also on data captured using a directional wireless receiver which provides a signal which depends on the orientation of the portable device relative to the wireless transmission source;
    user interface is operable to allow an operator to identify location reference data dependent on control inputs made by the user or augmented by positional or environmental sensor data; and wherein the device is operable to generate log data which associates template data with location reference data.

Further embodiments provide a portable locating device operable to detect one or more wireless transmission sources;
    a user interface operable to display data to a user and allow a user to input control operations; wherein the user interface is operable to display location feedback data to provide feedback to an operator on the orientation and/or proximity of the portable device relative to the one or more wireless transmission sources;
    wherein the location feedback data displayed is updated dependent on one or more rules defined for wireless packet fields in a wireless packet structure, the rules stored by the wireless device;

wherein location feedback data is updated dependent also on data captured using a directional wireless receiver for wireless data packets, the directional wireless receiver providing data which depends on an orientation and/or proximity of the portable device relative to the wireless transmission source to provide feedback as the user manipulates the device to adjust the orientation of the device;

wherein the user interface is operable to allow an operator to identify location reference data dependent on control inputs made by the user; and wherein the device is operable to generate log data which associates template data with location reference data.

The user interface may be operable to receive a control input and select a detection template dependent on the control input, wherein a detection template carries information defining one or more rules used detect wireless sources exhibiting behaviour defined by the rules.

A detection may be that a wireless source is of interest for being located.

A detection may be that the wireless source is behaving as a given wireless security threat.

The device may be operable to display at the user interface, data identifying one or more detected wireless sources.

The device may be operable to select a template dependent on a control input identifying one of the detected wireless sources identified in the display.

The display data may be generated dependent on a RSSI extracted from wireless packets received from detected wireless packet sources.

Display data may be generated for each by aggregating a RSSI extracted from wireless packets having in common device identifier data extracted from wireless packets to provide a display for each source of wireless packets identified by extracted device identifier.

The device may allow a user to locate one or more wireless sources by the stored rules identifying wireless sources for which to generate orientation-dependent display data for wireless signals of one or more detected sources.

The one or more rules may be selected dependent on user controls.

The one or more rules may be carried in template data which is selectable at the user interface to select the one or more rules used to detect the wireless source.

Template data may carry information on one or more rules used to define a given detection used to detect the wireless sources.

A user may select templates to select rules used, to determine which wireless sources to locate using the display data. This provides a device which allows wireless sources to be located by a user without the user providing data identifying a device to locate, wherein a device to locate is identified for location by one or more rules. The one or more rules may be carried in template data which identifies a detection of wireless sources to locate.

This provides a device which displays to a user data that depends on rules applied to given wireless packet fields to identify devices to locate where the data also depends on the orientation and/or proximity of the device relative to a device identified for location.

The stored rules may be operable to detect wireless sources of wireless packets received by the wireless device. The display data may allow a user to orient the device relative to a wireless source detected by the one or more rules. The user may thereby be able to locate a device agnostically to data provided by the wireless source that would identify the wireless source. In one example, display data allowing a user to locate wireless sources is generated for any wireless source detected by defined packets and/or packet fields as being of interest. In one example, a user may track any device which exhibits behaviour detected by the one or more rules without having data identifying the wireless source. In another example, the rules may detect a wireless source using behaviour which a human is not able to process to identify a wireless device.

In one example, one or more rules may detect a wireless source as a given type of security threat. The wireless device may allow a user to locate a device detected using the one or more stored rules. In an example in which a wireless source is detected as a security threat the wireless device user may allow a user to track a device detected agnostically to data identifying a given source.

The one or more rules used to detect a data source may be applied to wireless packets received by the device at a low-gain antenna. A wireless source may be identified.

The display data may be generated for detected wireless sources dependent on wireless packets received by the device at a high-gain antenna.

This may allow wireless sources in a wide range of directions relative to the device to be detected while allowing the display data to depend on the orientation and/or proximity of the high-gain antenna relative to the wireless source.

The control is operable to allow a user to select one or more elements for detection and tracking of a wireless device.

The one or more elements may identify a field in a wireless packet structure.

The wireless receiver may comprise a directional antenna so that the tracking feedback data depends on the orientation and/or proximity of the device.

Monitoring a network environment to receive packets from wireless data packet sources to detect as threats, or other characterisations, may be recognised as examining packets from these sources.

It is to be understood that the present invention as a process, device or structure of hardware and software components is not limited to the embodiments described herein and further, and additional embodiments in the spirit and scope of the invention will be apparent to the skilled reader from the examples illustrated with reference to the drawings. In particular, the invention may reside in any combination of features described herein, or may reside in alternative embodiments or combinations of these features with equivalents to given features known to the reader. Modifications and variations of the example embodiments of the invention discussed above will be apparent to those skilled in the art and may be made without departure of the scope of the invention as defined in the appended claims.

I claim:

1. An interactive device for detecting and locating transmitting devices transmitting wireless data packets in a wireless network environment, the transmitting devices exhibiting behaviour of interest in the wireless network environment, the device including:
   a monitoring module operable to monitor the wireless network environment to receive wireless data packets from the environment;
   a queue module operable to populate one or more queues for wireless data packets from the wireless data packets received from the environment, wherein the one or more queues are populated with packets received from the environment dependent on one or more detection template which defines a set of rules applied to data carried in received wireless data packets the set of rules defining behaviour of interest to detect whether one or more transmitting devices in the network are exhibiting a behaviour of interest;

a device-identifier module operable to extract device identifier data from the wireless data packets in the queue to identify said one or more detected transmitting devices exhibiting said defined behaviour;

a user interface operable to:
receive inputs indicating a selection of a detection template made at the user interface to allow an operator to select the defined behaviour of interest by a selection of a template and the rules defined by the template, display information indicating said selected behaviour of interest to be detected, display alert data carrying information indicating that a device in the network is exhibiting a behaviour of interest defined by the selected detection template, and display data carrying information on a signal strength of wireless data packets from the same device exhibiting the behaviour of interest defined by the selected template, and display data carrying information on a signal strength of received wireless data packets from the same one of the devices, and wherein the user interface is operable to receive said inputs, update the template to a selected template and update data carrying information on said signal strength so as to provide the user with a real-time interactive user interface which is responsive to selections of detection templates to determine behaviours of interest and responsive to movement of the device which changes the signal strength of packets from devices detected as exhibiting said behaviour.

2. A server operable to store and transmit modules of code and/or data defining rules and/or actions operable on packets received by the device of claim 1.

* * * * *